United States Patent [19]

Gulliver et al.

[11] Patent Number: 5,275,465
[45] Date of Patent: Jan. 4, 1994

[54] ADJUSTING MECHANISM FOR A CHAIR-MOUNTED COMPUTER INPUT DEVICE

[75] Inventors: Barron J. Gulliver, Sturgis, Mich.; Clarence G. Machlan, Elkhart, Ind.

[73] Assignee: Chrysalis Incorporated, Elkhart, Ind.

[21] Appl. No.: 790,596

[22] Filed: Nov. 7, 1991

[51] Int. Cl.⁵ ............................................. A47C 7/62
[52] U.S. Cl. .................................. 297/173; 248/287; 297/188; 297/411.32
[58] Field of Search ............... 297/411, 161, 162, 188, 297/194, 173, 417, 135, 144, 145, 154, 155; 248/279, 285, 287

[56] References Cited

U.S. PATENT DOCUMENTS

| | | | |
|---|---|---|---|
| 2,829,920 | 4/1958 | Cohen | 248/279 X |
| 4,277,102 | 7/1981 | Aaras et al. | 297/417 X |
| 4,455,008 | 6/1984 | MacKew | 297/194 X |
| 5,029,941 | 7/1991 | Twisselmann | 297/417 X |
| 5,143,422 | 9/1992 | Althofer et al. | 297/417 X |

FOREIGN PATENT DOCUMENTS

| | | | |
|---|---|---|---|
| 8603167 | 6/1986 | PCT Int'l Appl. | 297/411 |
| 2042056 | 9/1980 | United Kingdom | 248/287 |

Primary Examiner—Peter R. Brown
Attorney, Agent, or Firm—Renner, Kenner, Greive, Bobak, Taylor & Weber

[57] ABSTRACT

An adjusting device embodying the concepts of the present invention is incorporated in a mount by which a tray assembly adapted to support an input device for a computer is supported from a chair. The proximal end portion of a mounting bar is supported from a chair such that the mounting bar is disposed substantially horizontally from the chair. A substantially vertically disposed support assembly is rotatable mounted from the distal end portion of the mounting bar. The first end portion of an arm assembly is supported for articulation from the pivot assembly about an articulating axis that is disposed substantially horizontally. A tray assembly is pivotally supported from the second end portion of the arm assembly about an pivotal axis that is disposed substantially horizontally. Means may be provided selectively to establish the distance between the mounting bar and the articulating axis. Locking means may also be provided selectively to secure the pivotal position of the tray assembly with respect to the arm assembly, the articulated position of the arm assembly with respect to the support assembly and to establish the distance between the mounting bar and the articulating axis.

23 Claims, 15 Drawing Sheets

FIG-2
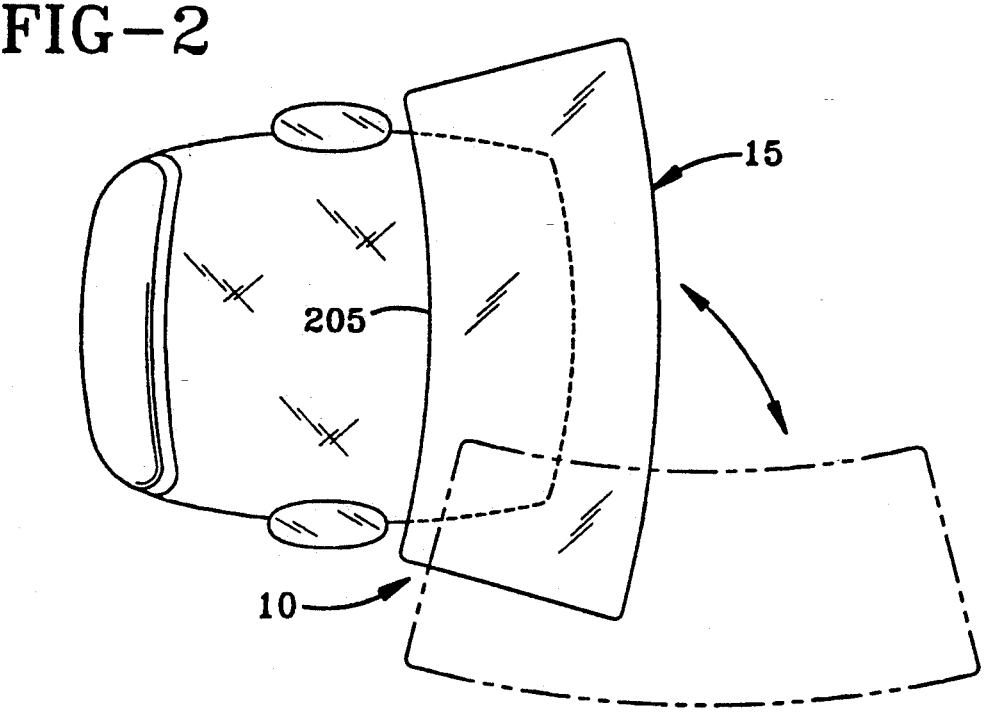
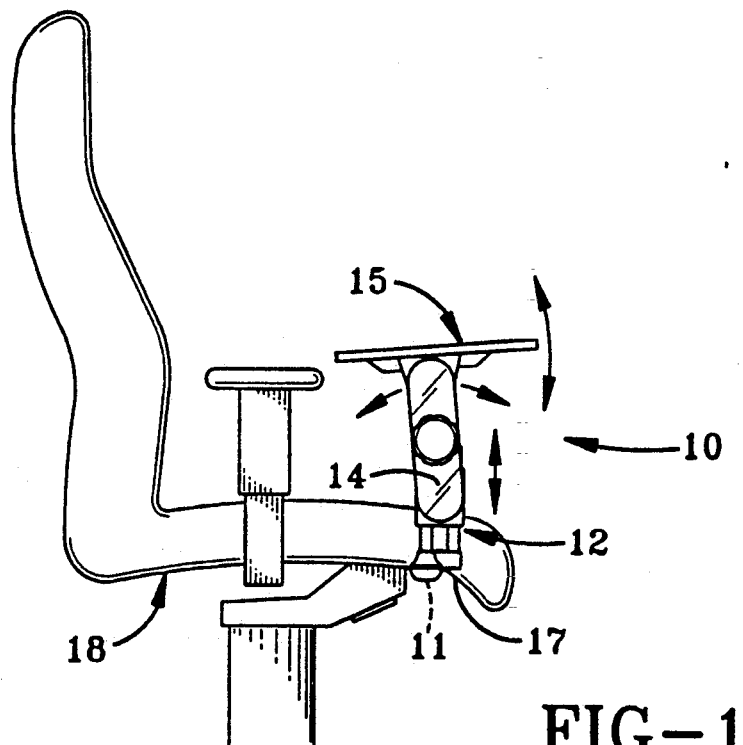
FIG-1

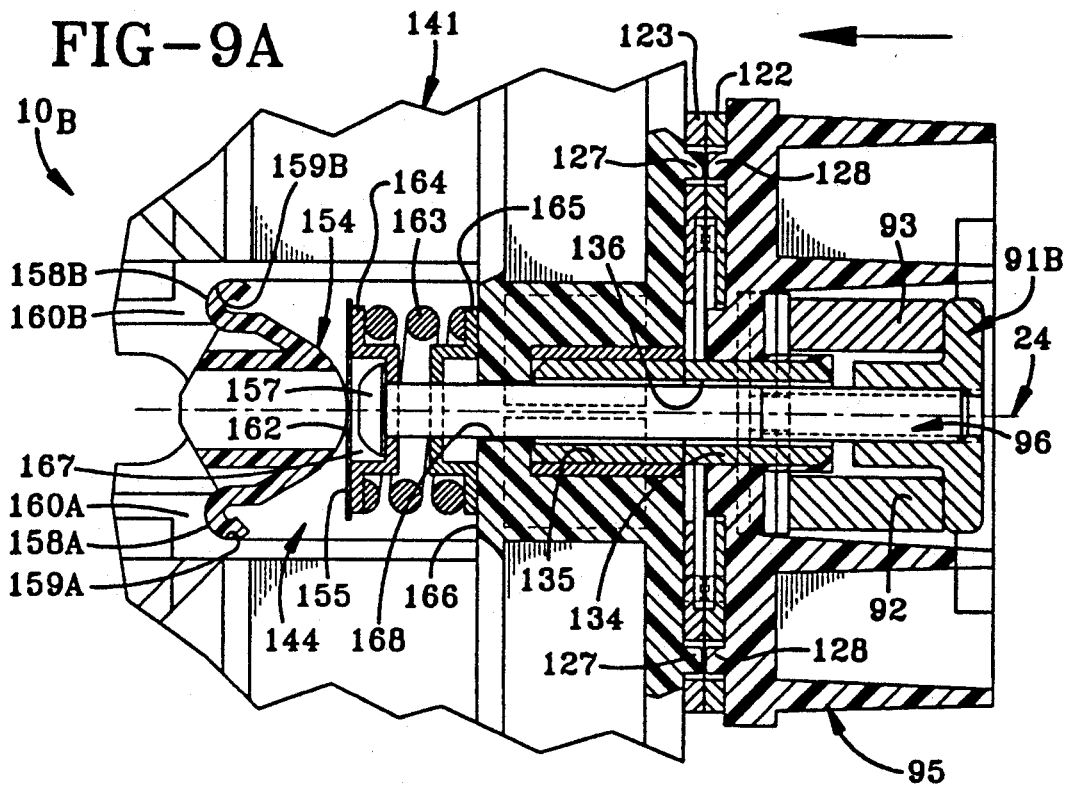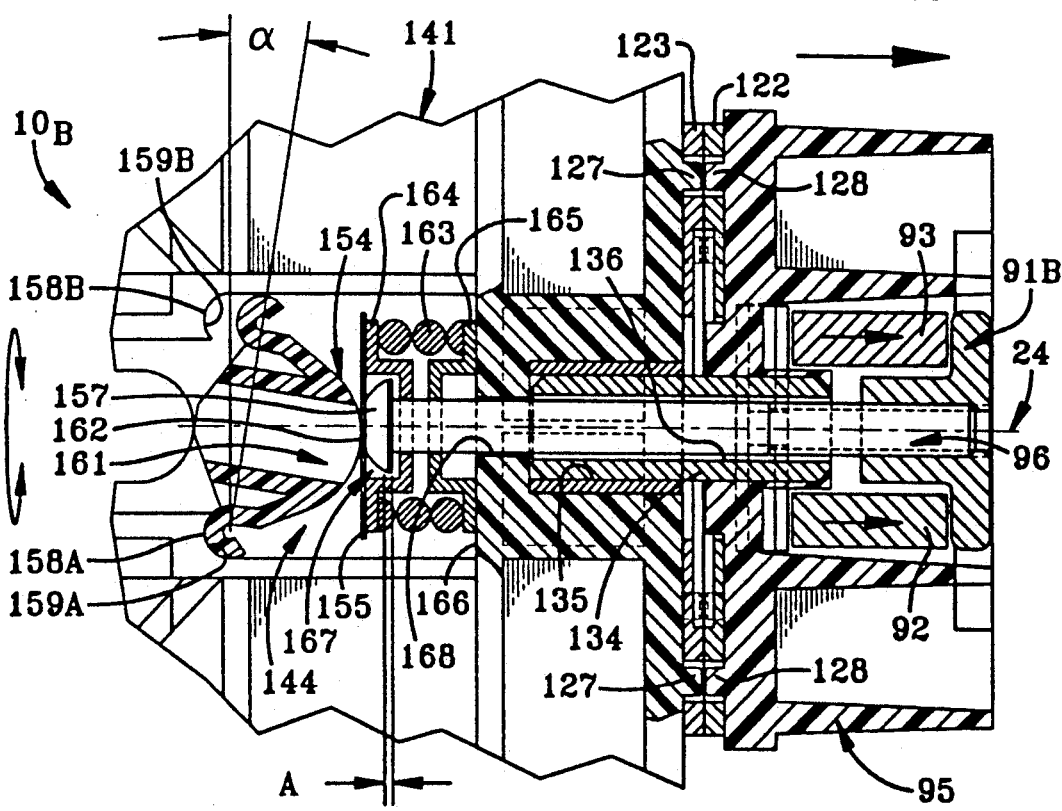

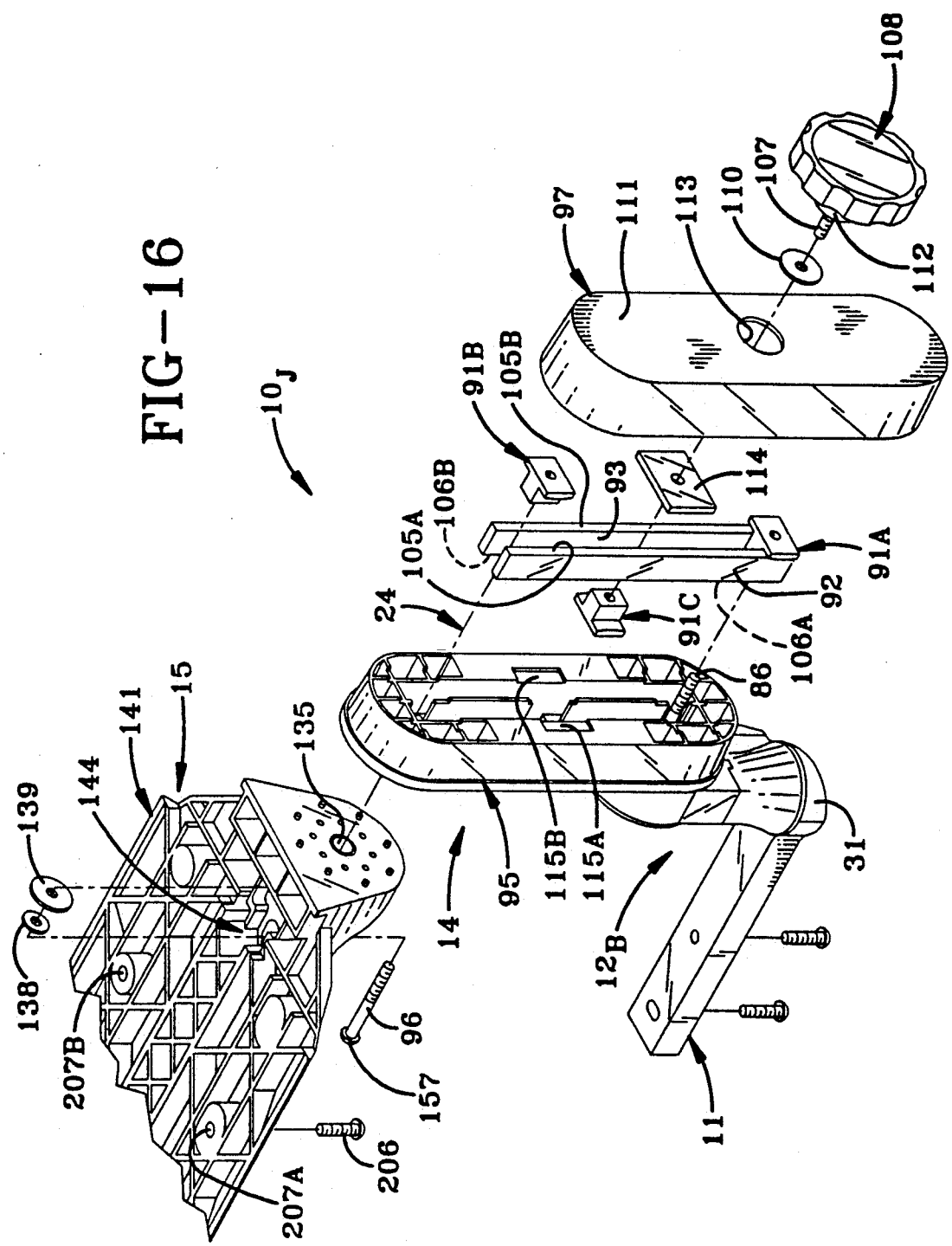

ADJUSTING MECHANISM FOR A CHAIR-MOUNTED COMPUTER INPUT DEVICE

TECHNICAL FIELD

The present invention relates generally to computer work station furniture. More particularly, the present invention relates to a chair-mounted tray assembly by which to support a computer input device. Specifically, the present invention relates to an adjusting mechanism by which to select the disposition of the tray assembly relative to the chair from which it is mounted for the maximum convenience of the person seated in the chair.

BACKGROUND OF THE INVENTION

Heretofore, the furniture available for computer operators provided for independent adjustments of the computer monitors and input devices relative to the desks on, or from, which they were supported. The chair at a work station could, of course, be adjusted independently of, and therefore relative to, the desk on which the computer equipment was supported. Nevertheless, it must be appreciated that no matter how many individual adjustments were provided, such arrangements effectively immobilize the operator while operating the computer. That is, the proper "registration" of the operator's hands with respect to the computer input device can be maintained only so long as the chair on which the operator is seated does not move relative to the independent desk, or other structural arrangement, from which the input device is supported. Inasmuch as the aforesaid registration of the computer operator relative to the computer, and particularly the input device, is accomplished by independently positioning not only the computer components relative to their supporting devices but also the chair relative to the supporting devices for the computer components, the computer operator can not rock or swivel in the chair while working without varying the particular registration desired by that particular operator. And yet, frequent movement of the operator is highly desirable. It has been found that movement of the operator enhances circulation and reduces the strain, tension and muscle cramping so often experienced when operating computers for long periods of time. Immobility, on the other hand, leads to physical discomfort, and occasional disability.

SUMMARY OF THE INVENTION

It is, therefore, a primary object of the present invention to provide an arrangement whereby the computer input device is supported directly from the chair in which the computer operator sits in order to assure registration between the computer operator and at least the computer input device, irrespective of how much the operator may move, rock or swivel, in the chair.

It is another object of the present invention to provide a mechanism by which to adjust a chair-mounted tray assembly upon which a computer input device may be supported.

It is a further object of the present invention to provide an adjusting mechanism, as above, which permits the tray assembly to be selectively disposed fore and aft with respect to the operator by movement of the tray assembly about an articulating axis.

It is a still further object of the present invention to provide an adjusting mechanism, as above, which permits the tray to be selectively tilted about a pivotal axis that is displaced from the articulating axis.

It is yet another object of the present invention to provide an adjusting mechanism, as above, variations of which may permit the articulating axis to be selectively displaced in a vertical direction.

It is a still further object of the present invention to provide an adjusting mechanism, as above, variations of which may permit selective adjustments without the need for manipulating a locking actuator.

It is an even further object of the present invention to provide an adjusting mechanism, as above, variations of which may permit selective adjustments by operating a single locking actuator.

It is an additional object of the present invention to provide an adjusting mechanism, as above, variations of which may permit selective adjustment by operating dual locking actuators.

These and other objects of the invention, as well as the advantages thereof over existing and prior art forms, which will be apparent in view of the following detailed specification, are accomplished by means hereinafter described and claimed.

In general, an adjusting mechanism embodying the concepts of the present invention is incorporated in the structure by which a tray assembly is mounted from a chair. The proximal end portion of a mounting bar is secured to a chair such that the mounting bar is disposed substantially horizontally. A substantially vertically disposed support assembly is mounted from the distal end portion of the mounting bar, and the support assembly may be rotatable about a vertical axis, if desired, to facilitate entering and exiting the chair. The first end portion of an arm assembly is supported for articulation from the pivot assembly, and a tray assembly is pivotally supported from the second end portion of the arm assembly.

One exemplary embodiment of an adjusting mechanism—and several variations—of a chair-mounted tray assembly adapted to support an input device for a computer are described in sufficient detail to effect a full disclosure of the subject invention. The exemplary adjusting mechanism, and the variations thereof, are described in detail without attempting to show all of the various forms and modifications in which the invention might be embodied; the invention being measured by the appended claims and not by the details of the specification.

BRIEF DESCRIPTION OF THE DRAWINGS

FIG. 1 is a side elevation of a chair with a supporting tray assembly mounted thereon by an adjusting mechanism which incorporates the concepts of the present invention;

FIG. 2 is a top plan view of the chair depicted in FIG. 1 and with the tray assembly depicted in the working position, in solid line, and in the access position by which to facilitate entry and exit of the operator from the chair, in chain line;

FIG. 9A is an enlarged, horizontal section taken substantially along the reference line 9—9 in FIG. 8 but with the release actuator received within an appropriate recess in the frame of the tray assembly and with the interrelated structural components having been assembled to represent their disposition with the locking mechanism in the engaged mode;

FIG. 9B is a view similar to FIG. 9A but with the release actuator having been swung by the lever to depict the disposition of the locking mechanism in the release mode;

DESCRIPTION OF AN EXEMPLARY EMBODIMENT

Figure 3:
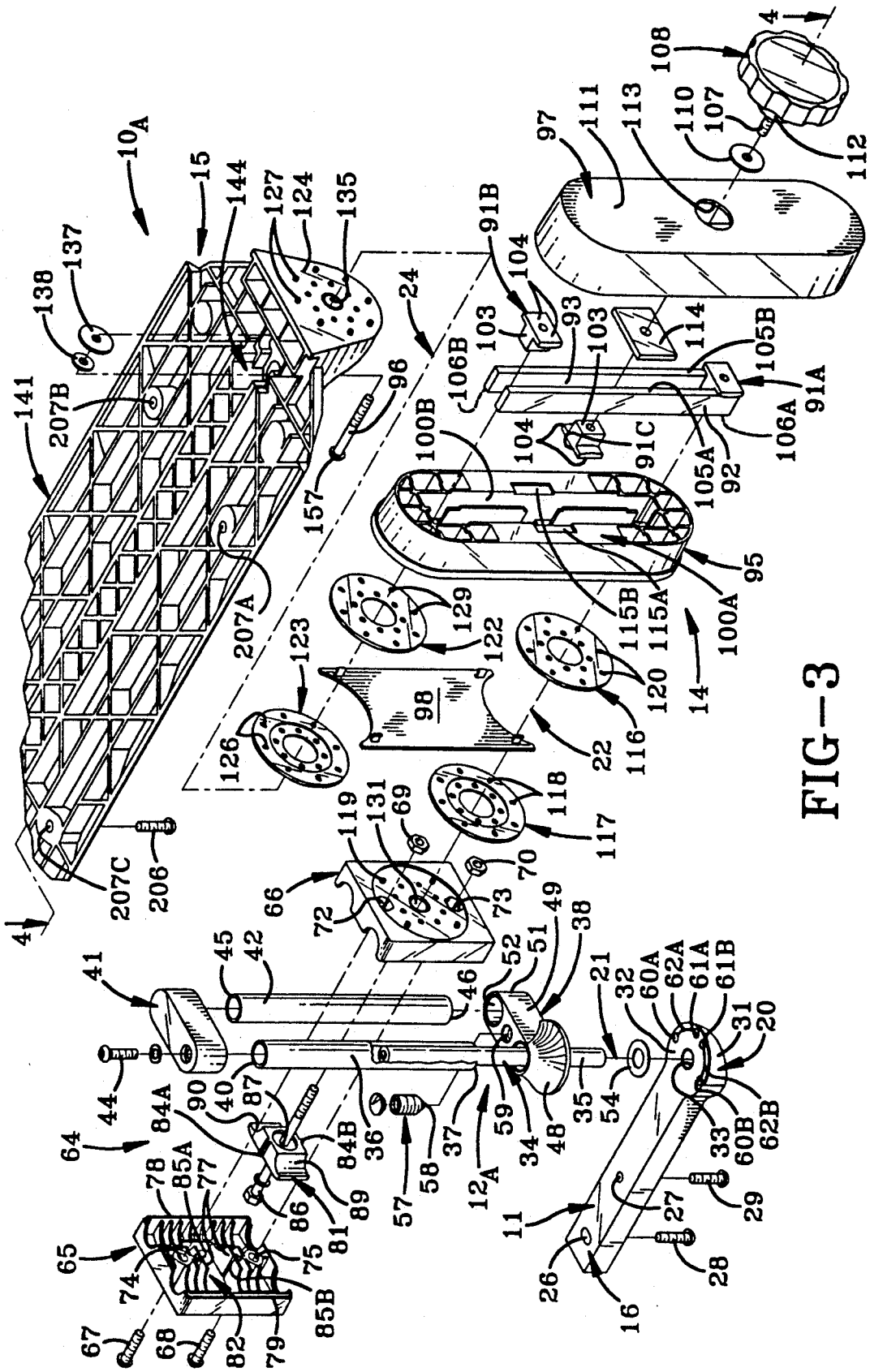
FIG. 3 is an exploded perspective depicting a mounting bar that is adapted to be substantially horizontally supported from the chair, a substantially vertically disposed support assembly that is rotatably supported from the mounting bar, an arm assembly that is supported for articulation from the support assembly and the frame portion of the tray assembly that is pivotally supported from the arm assembly—the adjustments in the three directions designated by the arrows in FIG. 1 being available by appropriate actuation to release or engage a locking mechanism with a single adjustment control knob.

Representative forms of an adjusting mechanism for a chair-mounted arrangement by which to support at least the input device for a computer are designated generally by the numeral 10 on the accompanying drawings. One form of an exemplary adjusting mechanism, identified by the alphanumeric designation $10_A$ and as detailed in FIGS. 3 through 10, includes a mounting bar 11, a vertical support assembly 12, an arm assembly 14, and a tray assembly 15. The proximal end portion 16 (FIG. 3) of the mounting bar 11 is secured to the underside 17 of a chair seating frame 18 (FIG. 1), and the distal end portion 20 of the mounting bar 11 defines a vertically extending, rotational axis 21 (FIG. 3) with respect to which the vertically disposed support assembly 12 is rotatably supported. The support assembly 12 presents a substantially horizontal articulation adjustment axis 22 with respect to which the arm assembly 14 is mounted for articulation. The arm assembly 14 also presents a substantially horizontal pivot axis 24 about which the tray assembly 15 may be adjustably tilted. In addition, supporting assembly $12_A$ incorporates means by which the articulation adjustment axis 22, and therefore the horizontal pivot axis 24, can be vertically adjusted.

The present invention is disclosed in conjunction with a number of variations. As such, in the detailed description which follows, a particular structural member, component or arrangement may be employed in more than one variation of the adjusting mechanism, or even at more than one location in a particular variation of the adjusting mechanism. When referring generally to that type of structural member, component or arrangement a common numerical designation shall generally be employed in each of the several variations described herein. However, when one of the structural members, components or arrangements so identified is employed at more than one location in a single variation, and that component is to be individually identified, it shall be referenced by virtue of a letter suffix employed in combination with the numerical designation employed for general identification of that structural member, component or arrangement. As an example of this usage two keyways shall be subsequently identified on one variation, and those keyways will have the same structure. As such, the keyways shall be generically identified by the numeral 85, but the specific keyways shall be individually identified as 85A and 85B, both in the specification and on the drawings. There are also two structural variations of the vertical support assembly which shall be generally identified by the number 12. However, the two specific configurations of that component shall be identified by a letter suffix which shall be represented as a subscript. Accordingly, the specific, individual variations of the support assemblies shall be identified as $12_A$ and $12_B$, both in the specification and on the drawings. This same suffix convention shall be employed throughout the specification.

With particular reference to the primary embodiment, which is presented in detail in FIGS. 3 through 7, the mounting bar 11 is depicted as having a pair of mounting bores 26 and 27 through which a pair of fasteners 28 and 29, respectively, extend and by which the mounting bar may be secured to the underside 17 of the chair seating frame 18 (FIG. 1). The mounting bore 26 nearest the proximal end portion 16 of the mounting bar 11 may be laterally elongated to permit some adjustment to the precise orientation of the mounting bar 11 on the chair seating frame 18. The distal end portion 20 of the mounting bar 11 terminates in a bulbous portion 31 which presents an upwardly facing substantially flat surface 32 having a substantially central, circular opening 33 through which the rotary axis 21 extends.

A guide bar, or support rod, 34 is received in the circular opening 33 and extends vertically upwardly from the mounting bar 11. Preferably, the lower end 35 of the guide bar 34 is fixedly secured within the opening 33 in order to provide a structural arrangement by which the remaining components carried by the mounting bar 11 may be provided with laterally stability. A first guide tube 36 surrounds the guide bar 34, is freely rotatable thereon, and has a lower end 37 that is secured in a lower tube retainer 38. The upper end 40 of the first guide tube 36 is fitted in an upper tube retainer 41 which may be rotatably secured to the guide bar 34 by a threaded fastener 44. A second guide tube 42 is also secured, at its respective upper and lower ends 45 and 46, in the upper tube retainer 41 and the lower tube retainer 38. The lower tube retainer 38 has an enlarged portion 48 which surrounds the lower end 37 of the first guide tube 36. Extending laterally outwardly from the enlarged portion 48 is an elongated portion 49 which terminates in a rounded end portion 51. An opening 52 penetrates the rounded end portion 51, and the lower end 46 of the guide tube 42 is received in the opening 52. A thrust washer 54 is disposed between the lower tube retainer 38 and the upwardly facing surface 32 on the mounting bar 11. The thrust washer 54 provides a low friction interface between the vertical support assembly $12_A$ and the mounting bar 11 to facilitate positioning of the support assembly $12_A$ relative to the mounting bar 11, and about the vertically oriented, rotational axis 21.

A conventional detent assembly 57 may be mounted in a receiving bore 59 provided in the elongated portion 49 of the lower tube retainer 38. The detent assembly 57 includes a conventional, spring-biased ball member 58 which cooperates with recesses 60A and 61A incorporated in the upwardly facing surface 32 on the bulbous portion 31 of the mounting bar 11 to establish the two limit positions between which the vertical support assembly $12_A$ may be rotated. A track 62A extends between the recesses 60A and 61A to guide the ball member 58 during rotation of the support assembly $12_A$ between the two limit positions. A second pair of recesses 60B and 61B as well as a track 62B are provided in the upwardly facing surface 32 for providing positioning of the vertical support assembly $12_A$ when the mounting bar 11 is secured in the opposite direction on the underside 17 of the chair seating frame 18. Thus, the same mounting bar 11 may be used to accommodate both left and right hand configurations irrespective of whether desired with respect to the manufacture of original equipment or for "in-field" conversions, thereby reducing the number of components required in inventory.

A vertical adjustment assembly 64 is mounted on the guide tubes 36 and 42. The vertical adjustment assembly includes opposed first and second slide blocks 65 and 66 secured together by threaded fasteners 67 and 68 and their associated nuts 69 and 70. The hex nuts 69 and 70 are received in hexagonal openings 72 and 73, respectively, formed in the second slide block 66, and the fasteners 67 and 68 pass through cylindrical openings 74 and 75, respectively, which penetrate the first slide block 65 operatively to engage the nuts 69 and 70. The first slide block 65 has a plurality of central flat surfaces 77 presented on either side of the openings 74 and 75 as well as flat outer edges 78 and 79. The second slide block 66 has a mirror image surfaces and edges which cooperate with the surfaces 77 and the edges 78 and 79 on the first slide block 65 to maintain the availability of a sliding fit between the slide blocks 65 and 66 and the guide tubes 36 and 42, even when the slide blocks 65 and 66 are conjoined by the fasteners 67 and 68.

The sliding fit between the assembled slide blocks 65 and 66 and the guide tubes 36 and 42 may, however, be selectively negated to permit one to move the assembled slide blocks to specific vertical locations along the guide tubes 36 and 42. Specifically, a lock block 81 is loosely received in a cavity 82 recessed in the first slide block 65 and is guided for translational movement therein by a pair of tangs 84A and 84B which cooperate with the respective keyways 85A and 85B formed in the first slide block 65. A first, threaded draw bolt 86, which is disposed concentrically of the articulation adjustment axis 22, passes through a central aperture 87 that penetrates the lock block 81. A pair of quarter-cylindrical lock surfaces 89 and 90 presented from the lock block 81 are disposed for frictionally locking engagement with the guide tubes 36 and 42, respectively. The first, threaded draw bolt 86 threadably engages a clamp actuator 91A which cooperates with a pair of clamp bars 92 and 93 received within the housing 95 of the arm assembly 14 to secure the position of the vertical support assembly $12_A$, and therefore the position of the articulation axis 22, in a manner to be hereinafter more fully described.

A second draw bolt 96 is employed to secure the tray assembly 15 to the arm assembly 14, as will also be hereinafter more fully described.

In addition to the housing, or body, 95, the arm assembly 14 includes a cover 97 and a cover plate 98 that are received on opposite sides of the housing 95. The clamp bars 92 and 93 are disposed in rectangular recesses 100A and 100B provided in the housing 95, as best seen in FIG. 3.

A plurality of clamp actuators 91 are utilized in the present embodiment. Each clamp actuator 91 has a substantially T-shaped cross section with the center leg 103 of each being disposed between the clamp bars 92 and 93 and with the transverse cross piece 104 of each abutting an appropriate reaction surface on the clamp bars 92 and 93. Clamp actuators 91A and 91B position the transverse cross pieces 104 in abutment with the reaction surfaces which constitute the edges 105A and 105B of the respective clamp bars 92 and 93. Conversely, clamp actuator 91C has the transverse cross piece 104 disposed in abutment with the reaction surfaces which constitute the opposite edges 106A and 106B of the respective clamp bars 92 and 93. The center leg 103 of clamp actuator 91A cooperatively engages the first threaded draw bolt 86. The center leg 103 of clamp actuator 91B cooperatively engages the second threaded draw bolt 96, and the center leg 103 of the clamp actuator 91C cooperatively engages the threaded extension 107 of an adjustment control knob 108. The shank 112 of the adjustment control knob 108 passes through an aperture 113 in the outer surface 111 of the cover 97 to engage a generally rectangular thrust force distribution washer 114 which is supported across at least the recessed shelves 115A and 115B in the housing 95. A bearing washer 110 may be interposed between the shank 112 of the adjustment control knob 108 and the thrust force distribution washer 114 to reduce the frictional forces therebetween.

Because the thrust force distribution washer 114 abuts the supporting shelves 115 recessed into the housing 95, rotation of the adjustment control knob 108 in a tightening direction will drive the transverse cross piece 104 on clamp actuator 91C into engagement with the reaction surfaces defined by the edges 106A and 106B on the respective clamp bars 92 and 93, thus displacing the clamp bars and forcing the reaction surfaces defined by the edges 105A and 105B of the respective clamp bars 92 and 93 against the transverse cross piece 104 on each of the clamp actuators 91A and 91B which, in turn, longitudinally translate the respective draw bolts 86 and 96 toward the cover 97.

Figure 6:
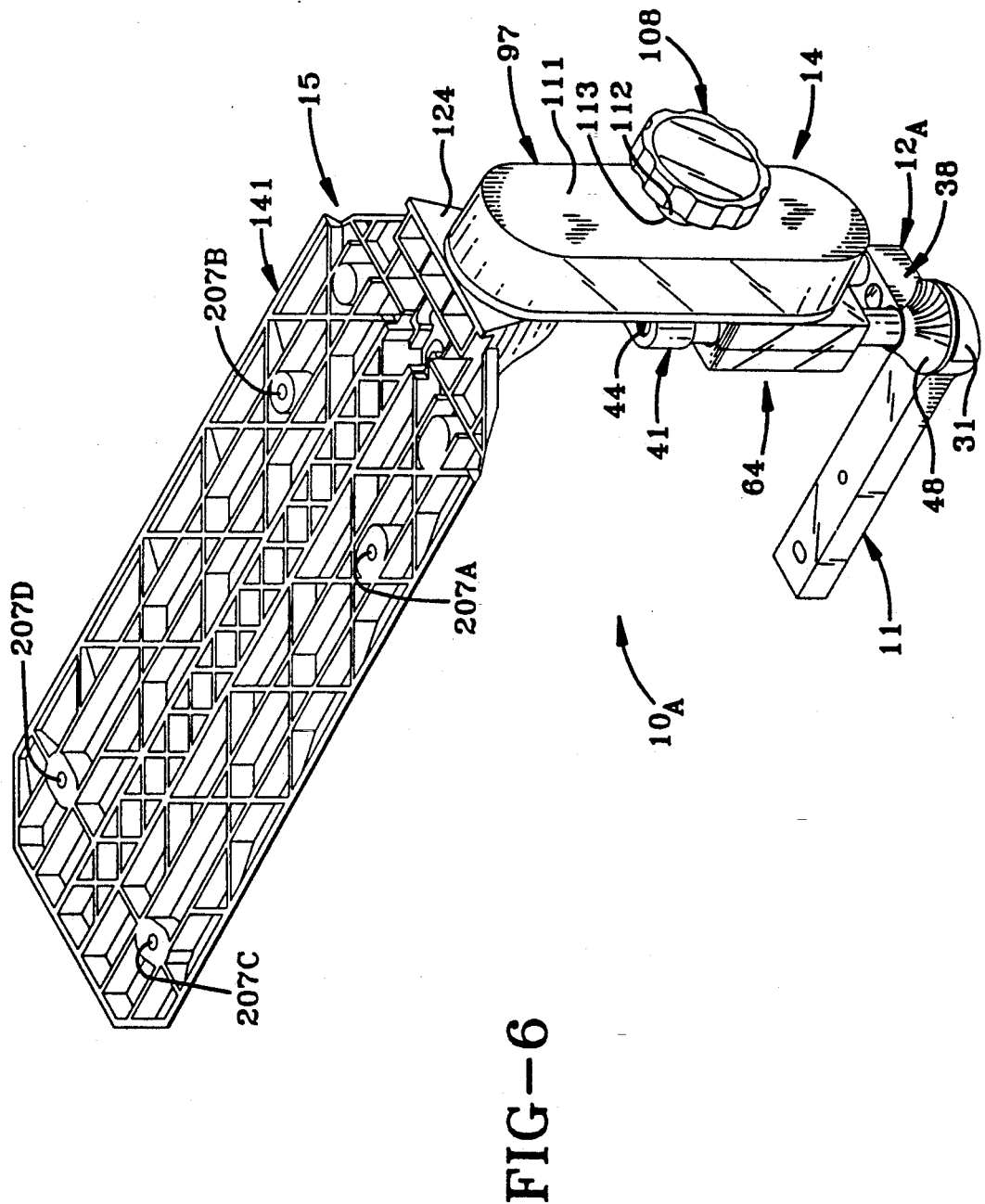
FIG. 6 is a view similar to FIGS. 3 and 5 but with all the components having been assembled.
Figure 7:
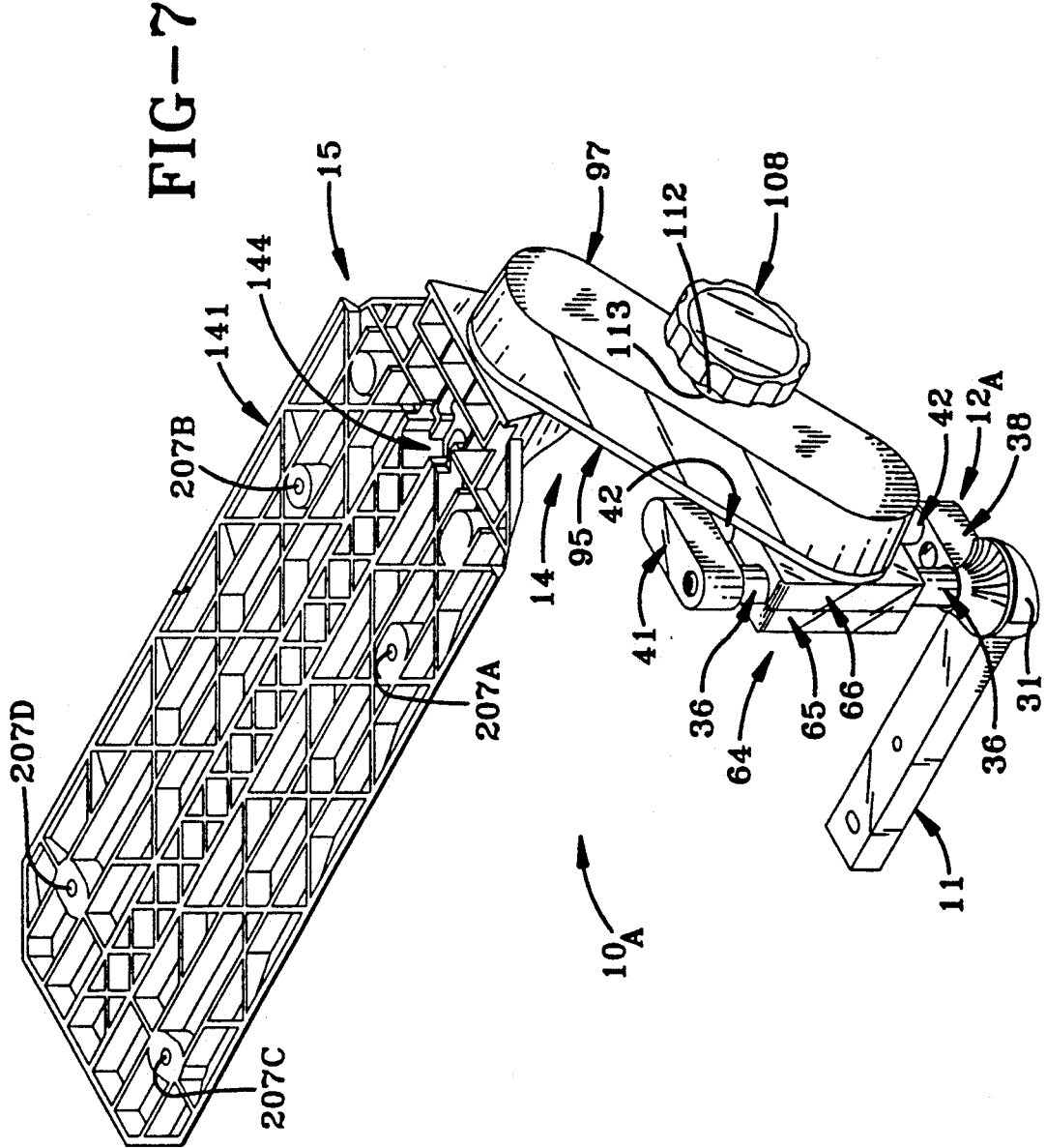
FIG. 7 is a view similar to FIG. 6 but with the arm assembly having been articulated with respect to the support assembly in order to move the tray assembly forwardly and with the tray assembly having been pivoted to remain substantially horizontal.

The arm assembly 14 has a pair of brake pads 116 and 117 disposed between the housing 95 and the second slide block 66. The second brake pad 117 has a plurality of apertures 118 which are alignable with and receive the posts 119 formed on the second slide block 66 to prevent relative rotation therebetween. The first brake pad 116 has a plurality of apertures 120 which engage the posts 121 (FIG. 4) extending outwardly from the housing 95 to mount the first brake pad 116 non-rotatably on the housing, or body portion, 95 of the arm assembly 14. When the adjustment control knob 108 is rotated in the tightening direction, the draw bolt 86 will cause the lock block 81 and slide block 66 to engage the guide tubes 36 and 42 with sufficient frictional contact to secure the vertical adjustment assembly 64 to the guide tubes 36 and 42, thereby directly establishing the vertical position of the articulation adjustment axis 22, and indirectly the vertical height of the tray assembly 15. The resultant translation of the draw bolt 86 will also cause the brake pads 116 and 117 to be simultaneously urged into frictional engagement, thereby establishing the angular, or articulation, position of the arm assembly 14 relative to the support assembly $12_A$. The angular position of the arm assembly 14 can be vertically oriented, as represented in FIG. 6 or skewed, as depicted in FIG. 7.

A pair of brake pads 122 and 123 are disposed between the housing 95 of the arm assembly 14 and an end surface 124 on the tray assembly 15. The second brake pad 123 has a plurality of apertures 126 which mount the pad 123 on posts 127 formed on the surface 124 to limit the relative rotation between the second brake pad 123 and the tray housing 15. The first brake pad 122 is mounted on similar posts 128 (FIG. 4) formed on the housing 95 and which are received through apertures 129 in the first brake pad 122 to limit the relative rotation between the first brake pad 122 and the housing 95. As such, when the adjustment control knob 108 is rotated in a tightening direction, the second draw bolt 96 serves to urge the brake pads 122 and 123 into frictional engagement, thereby establishing the angular position of the tray 15 about the pivot axis 24 and relative to the arm assembly 14. The tray assembly 15 can thereby be tilted independently of the angular articulation of the arm assembly 14 relative to the support assembly $12_A$.

In summary, the tilting disposition of the tray assembly 15 about the pivotal axis 24, and the articulation of the arm assembly 14 about the articulating axis 22 are independently achievable. The vertical adjustment of the tray assembly 15, accomplished by the disposition of the adjustment assembly 64 along the guide tubes 36 and 42, is also independent of the other adjustments, even though all adjustments are secured by locking mechanisms that can be actuated by a single adjustment control knob 108.

Figure 4:
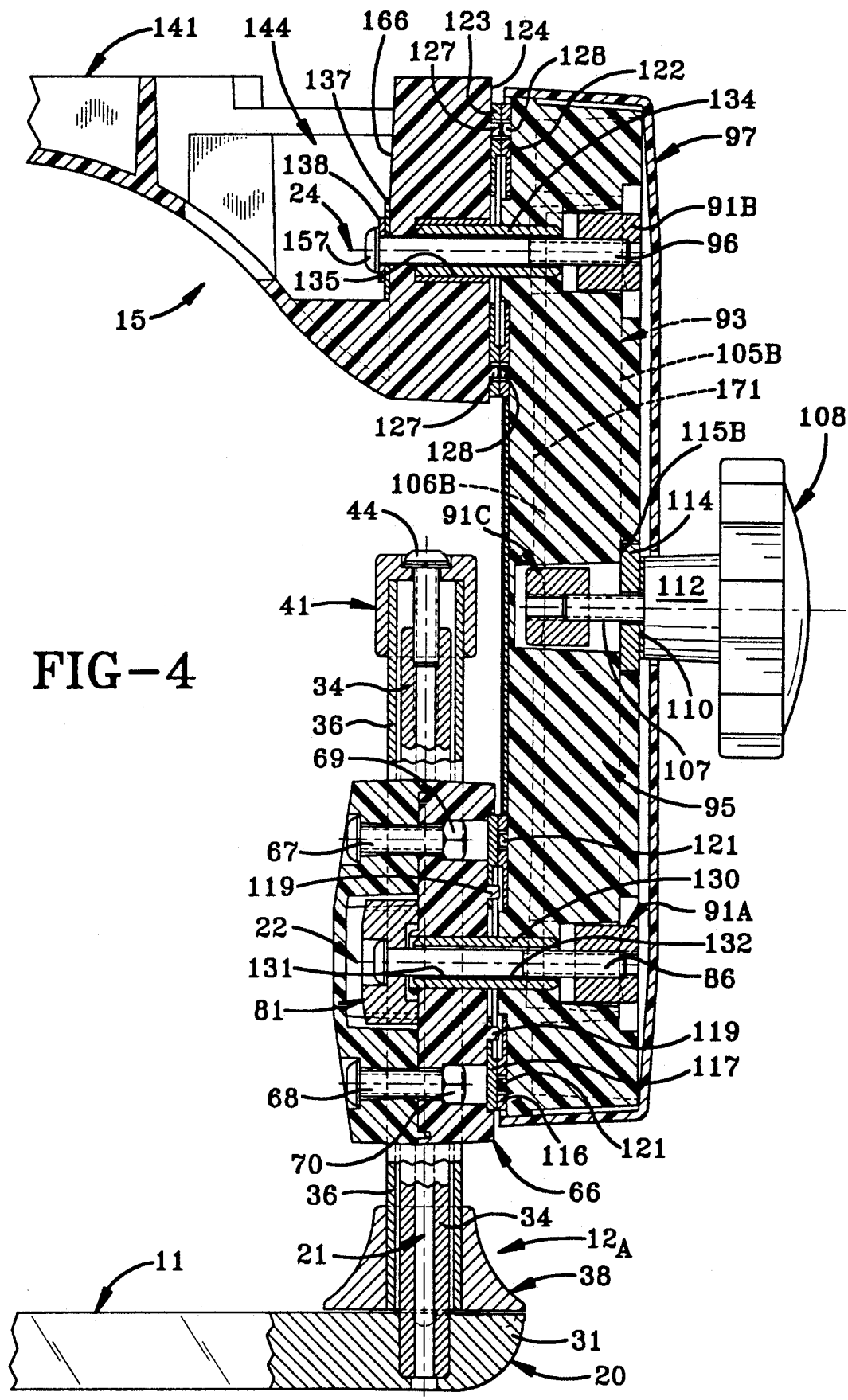
FIG. 4 is an enlarged, vertical section taken substantially along line 4—4 of FIG. 3 to depict the interrelationship between the structure of the arm assembly and the structure of the support assembly as well as between the structure of the arm assembly and the structure of the tray assembly.

As best seen in FIG. 4, the housing 95 has a first post 130 extending laterally outwardly therefrom in the direction of the second slide block 66. The first post 130 fits within an opening 131 located substantially centrally of the second slide block 66. The first post 130 has a longitudinal passage 132 extending therethrough and through which the first draw bolt 86 slidably passes prior to being threaded into the clamp actuator 91A. A second post 134 also extends laterally outwardly from the housing 95 for insertion into a bore 135 formed in the face 124 of the tray assembly 15. The second post 134 has a longitudinal passage 136 extending longitudinally therethrough to receive the second draw bolt 96 and thereby provide rotary support for, and a means by which to center, the tray assembly 15 and the second draw bolt 96 with respect to the arm assembly 14. To reduce the concentration of pressure applied by the draw bolt 96 upon the frame 141 of the tray assembly 15, one may interpose one or more washers 137 and 138 between the head 157 of the draw bolt 96 and the reaction surface 166 presented by the recess 144 in the tray frame 141.

First Variation

Figure 8:
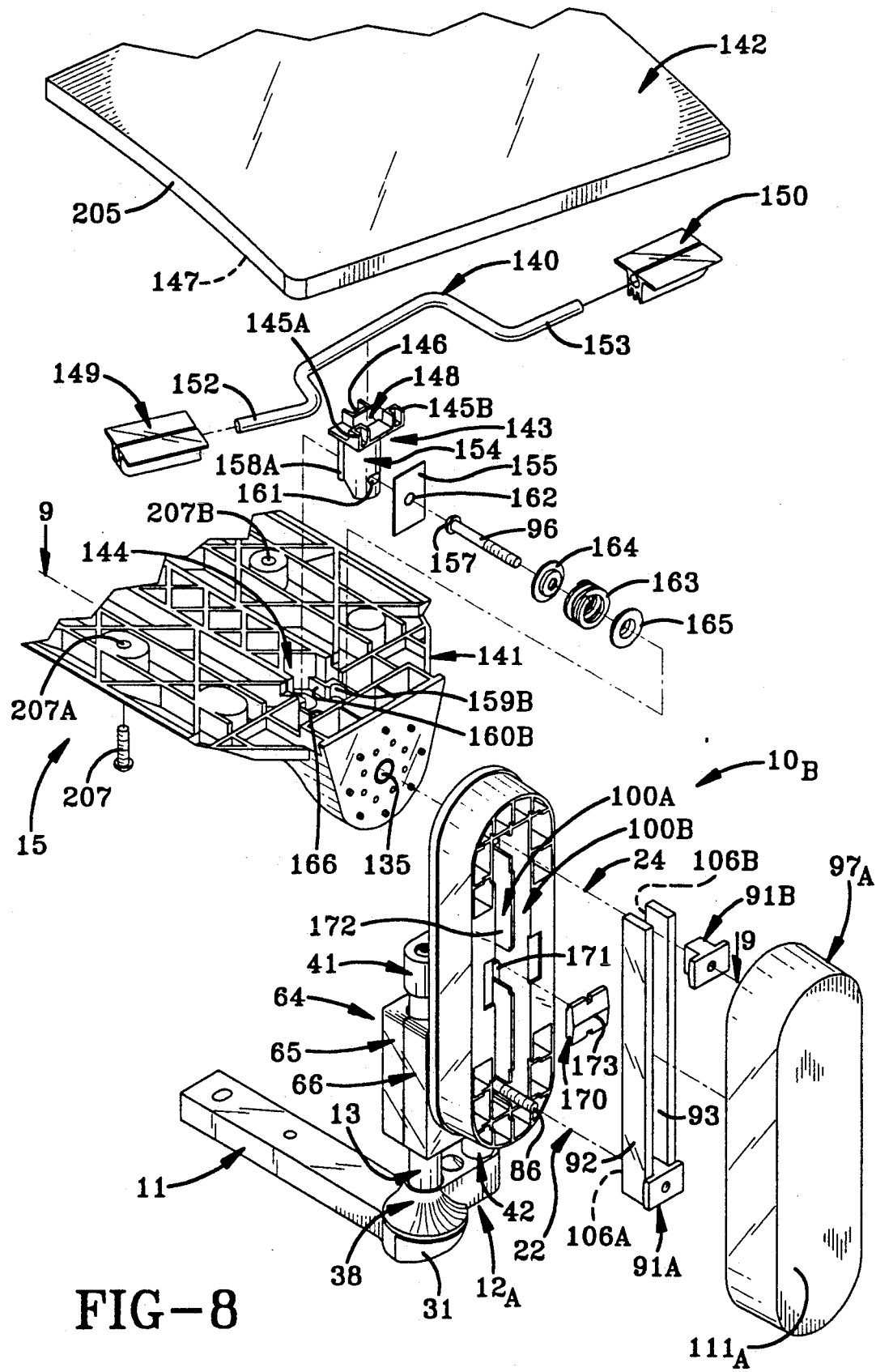
FIG. 8 is an exploded perspective of a variation of the embodiment depicted in FIGS. 3 through 7 in that the adjusting mechanism is controlled by a lever.

An adjustment mechanism $10_B$, which constitutes a variation of mechanism $10_A$, is shown in FIGS. 8, 9A and 9B. The mechanism $10_B$ incorporates the same mounting bar 11 and vertical support assembly $12_A$ as shown and described in conjunction with FIGS. 3-7. In addition, the same brake pad structure is utilized. However, the adjusting mechanism $10_B$ is different from the mechanism $10_A$ in that a double ended lever 140 (FIG. 8) is operatively positioned in the tray assembly 15. In fact, the lever 140 is located between the tray frame 141 and the tray surface member 142. So located, the lever 140 cooperatively engages a lever release actuator 143 which is disposed for swinging movement in a recess 144 provided in the tray frame 141.

The actuator 143 has dual, upwardly extending legs 145A and 145B located in spaced, and effectively opposed, relation with a single, upwardly extending leg 146. The lever 140 is received between the opposed legs 145 and 146. The upper extent of the legs 145 and 146 are disposed in proximity to the under surface 147 of the tray surface member 142 and cooperate to form a channel 148 which prevents the lever 140 from being extricated unless the tray surface member 142 is removed from the tray frame 141. The lever 140 has a pair of finger control handles 149 and 150 secured to the respective end portions 152 and 153. The finger control handles 149 and 150 are disposed beneath the tray surface member 142 out of view of the operator but within easy reach of the operator's fingers.

As best seen in FIGS. 9A and 9B, the actuator 143 has a cam surface 154 which is disposed in opposition to the bore 135 which passes through the end surface 124 of the tray frame 141. The cam surface 154 preferably has a generally cylindrical appearing cross section which abuts a reaction plate 155. The head 157 of the second draw bolt 96 is also disposed in opposition to the cam surface 154, and the head 157 is separated from the cam surface 154 by the reaction plate 155.

A pair of bearing surfaces 158A and 158B are formed on the actuator 143 and are disposed operatively to engage respective receiving journals 159A and 159B which are formed on the wall members 160A and 160B, respectively, presented by the tray frame 141 to position the receiving journals 159 within the recess 144. As the lever 140 is operated by one finger control handle 149 or the other 150, the actuator 143 will swing about one or the other of the receiving journals 159A or 159B, the results of which are more fully hereinafter described.

A spring 163 and spring seats 164 and 165 are supported on the second draw bolt 96 and are disposed between the head 157 of the draw bolt 96 and a reaction surface 166 provided in the tray frame 141. In fact, the head 157 may be received within the cupped recess 167 in spring seat 164. An opening 168 penetrates the reaction surface 166 to register with the passage 136 in the post 134 which is received within the bore 135. The second draw bolt 96 thus passes through the opening 168 and the passage 136 operatively to engage the clamp actuator 91B.

As is apparent by comparing the disposition of the actuator 143, and the components associated therewith, as represented in FIG. 9A with the disposition of the actuator 143, and the components associated therewith, as depicted in FIG. 9B, swinging movement of the actuator 143 about either receiving journal 159A or 159B will apply pressure on the spring seat 164, through reaction plate 155, to compress the spring 163 between the actuator 143 and the reaction surface 166. That same pressure applied to the reaction plate 155 is also available to act upon the head 157 to assure that the second draw bolt 96 may be displaced through a distance "A", as shown in FIG. 9B. The swinging movement which achieves the aforesaid results is depicted as occurring about receiving journal 159A, and through an angle $\alpha$. The resulting translatory displacement of the second draw bolt 96 will loosen the frictional engagement between the brake pads 122 and 123 and permit tilting adjustment of the tray assembly 15. The compression of the spring 163 will also serve to return the actuator 143 to the neutral position depicted in FIG. 9A when the operator releases the finger pressure applied to either control handle 149 or 150.

In order to achieve the foregoing result the clamp actuator 91C, and the associated adjustment control knob 108 utilized in adjusting mechanism $10_A$, are replaced by a rocker plate 170 (FIG. 8) which rests transversely across the base wall 171 of the recesses 100A and 100B in the housing 95. In fact, the divider wall 172 between the recesses 100A and 100B is relieved to accommodate placement of the rocker plate 170 such that a fulcrum edge 173 presented from the rocker plate 170 will engage the edges 106A and 106B on the respective clamp bars 92 and 93 in order that the clamp bars 92 and 93 may rock. The clamp bars 92 and 93 are urged into abutment with the fulcrum edge 173 on the rocker plate 170 by the force in the spring 163 acting through the second draw bolt 96 and the clamp actuator 91B con-
joined thereto. The first draw bolt 86, and clamp actuator 91A operatively connected thereto, are also subjected to the force of the spring 163 such that the spring 163 effects frictional engagement between the brake pads 116 and 117 and drives the lock block 81 into clamping engagement with the guide tubes 36 and 42.

As previously explained, control of the brake pads 116 and 117 permits selective positioning of the tray assembly 15 about the articulation axis 22, and control of the lock block 81 also permits selecting the vertical position of the tray assembly 15. Thus, through manipulation of the lever 140, the operator can individually adjust any of the position controls or simultaneously adjust any combination thereof. It should be noted that without the use of an adjusting control knob 108, the cover $97_A$ may have a continuous, uninterrupted outer surface $111_A$.

As depicted, a laterally elongated opening 161 may penetrate the actuator 143 in registry with a bore 162 through the reaction plate 155. These openings 161 and 162 permit one to access the head 157, which can accommodate an allen wrench, to adjust the initial tension of the spring 163 in order to assure that selective actuation of the lever 140 will release and tighten the adjusting mechanism $10_B$, as desired.

Second Variation

Figure 10:
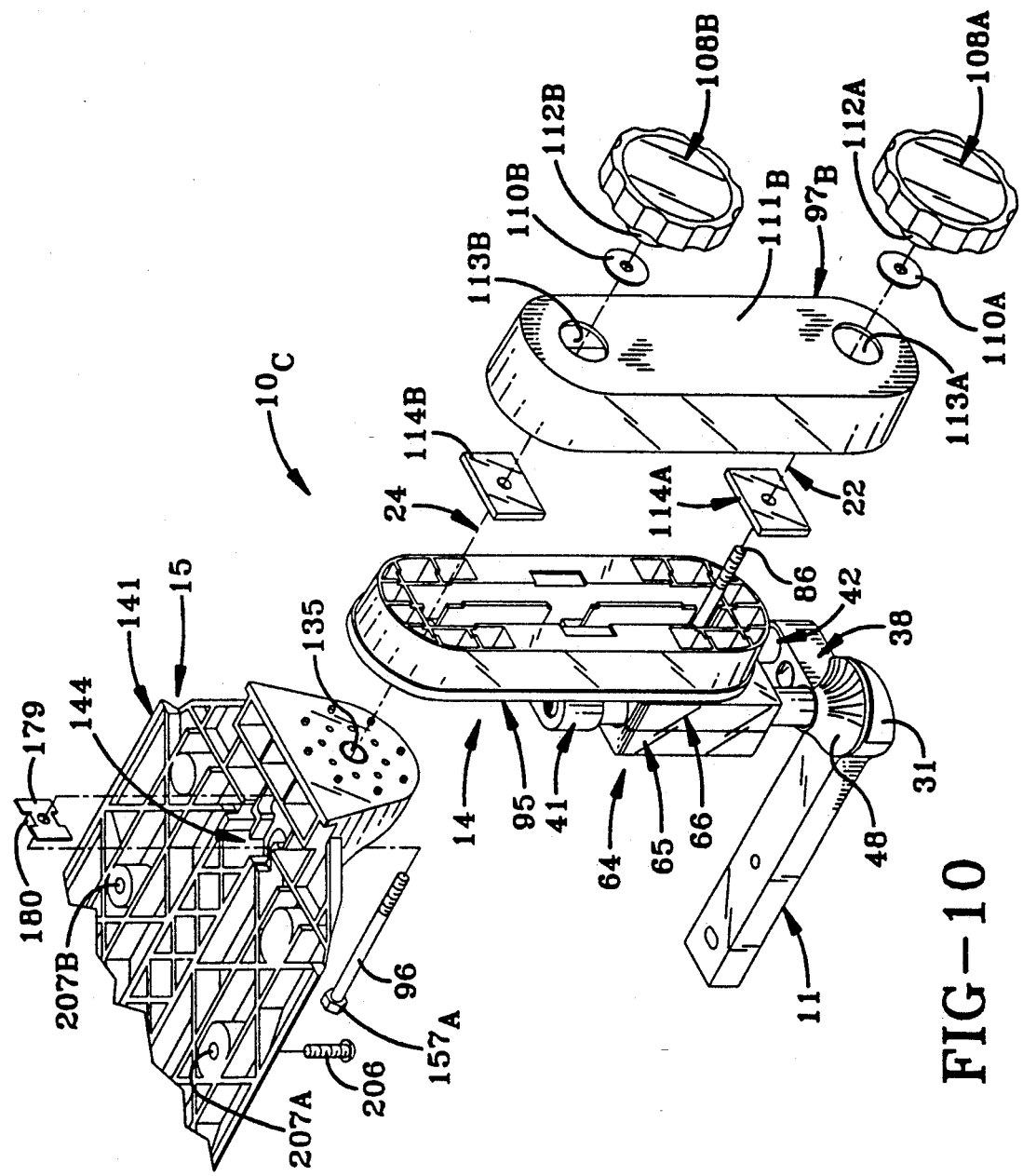
FIG. 10 is an exploded perspective of a further variation of the adjusting mechanism in that the locking mechanism is actuated by two knobs, one selectively to control articulation of the arm assembly and the vertical position thereof and the second to control pivotal movement of the tray assembly.

The variant adjusting mechanism $10_C$ shown in FIG. 10 utilizes the same components for effecting vertical adjustment of the articulation axis 22, the same components for controlling the angular positioning of the arm assembly 14 about the articulation axis 22 and for controlling the height of the articulation axis 22 as well as the same components for controlling the angular position of the tray assembly 15 about the pivot axis 24 as were previously described herein with respect to the exemplary embodiment $10_A$ depicted and described in conjunction with FIGS. 3 through 7. However, in the adjusting mechanism $10_C$ depicted in FIG. 10, the operator is provided with separate controls including one control for the adjustment around the pivot axis 24, and a second control for the vertical positioning of, and angular positioning about, the articulation axis 22.

The mechanism by which to accomplish adjustments relative to the articulation axis 22 includes a first draw bolt 86 that is directed through a thrust force distribution washer 114A operatively to engage an adjustment control knob 108A. The shank 112A on knob 108A extends through an opening 113A in the outer surface $111_B$ of the cover $97_B$ to interact with the thrust force distribution washer 114A. A bearing washer 110A may be interposed between the shank 112A and the thrust washer 114A for the same purposes previously discussed herein relative to mechanism $10_A$. Rotation of the adjustment control knob 108A provides the operator with the actuating control necessary not only for adjusting the arm assembly 14 about the articulation axis 22 but also for directly selecting the desired height of the articulating axis 22, which indirectly determines the height of the tray assembly 15.

Further with respect to the variant mechanism $10_C$, the head $157_A$ (which has a polygonal outer edge surface) on the second draw bolt 96 is captured in a hex washer plate 179 that is supported in the recess 144 provided in tray frame 141. The hex washer plate 179 has reaction tabs 180 which engage the tray frame 141 in such a way as to prevent it, and thus the second draw bolt 96, from rotating. The second draw bolt 96 also passes through the components received within the bore 135 in the tray assembly 15, as previously discussed with respect to FIGS. 3-7, and into the housing 95 operatively to engage the control knob 108B. The shank 112B on knob 108B extends through the opening 113B in the outer surface 111$_B$ of the cover 97$_B$ to interact with the thrust force distribution washer 114B. A bearing washer 110B may also be interposed between the shank 112B and the thrust washer 114B for the same purposes previously discussed herein. Rotation of the adjustment control knob 108B provides the operator with the actuating control necessary for adjusting the tray assembly 15 about the pivot axis 24.

Third Variation

Figure 11:
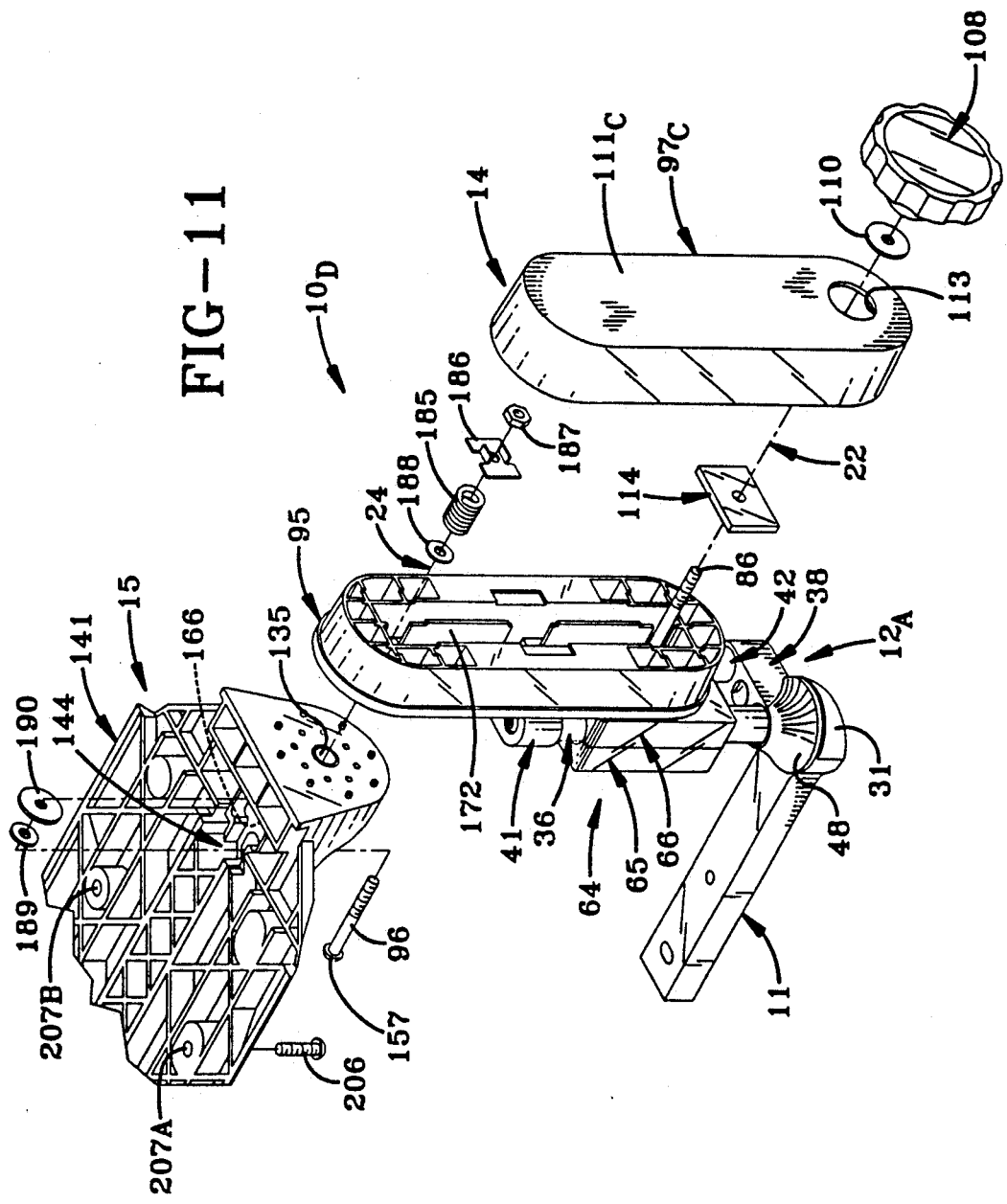
FIG. 11 is an exploded perspective of another variation in which the locking mechanism which controls pivotal adjustment of the tray assembly is spring biased to permit pivotal adjustment of the tray assembly without either a lever or a knob being required to actuate the locking mechanism but the locking mechanism which controls articulation of the arm assembly, and the vertical position thereof, is actuated by a knob.

The variation represented by the adjusting mechanism 10$_D$ shown in FIG. 11 provides a single adjustment control knob 108 for actuating the locking mechanism by which to permit selection of the vertical disposition of the articulation axis 22, and articulation of the arm assembly 14 thereabout, as described in conjunction with FIG. 10. Although that description is not repeated at this location, the structure which permits the draw bolt 86 to interact with the adjustment control knob 108 through the single opening 113 in the outer surface 111$_C$ of the cover 97$_C$ is identified by the same numbers in FIG. 11 as are used in conjunction with the description for the same structure as that structure was described relative to the variation shown and described in conjunction with FIG. 10 set forth previously herein.

A friction resistant arrangement is employed to control the angular positioning of the tray assembly 15 about the pivot axis 24. The friction resistant adjustment for tilting the tray assembly 15 employs a pair of brake pads 122 and 123, as shown and described with respect to FIGS. 3 and 4, which are maintained in engagement by a spring 185 which surrounds the second draw bolt 96 and is confined between the housing 95 and a hex washer plate 186. The draw bolt 96 threadably engages a nut 187 which is captured by, and therefore held non-rotatable relative to, the hex washer plate 186 which in turn is held non-rotatable relative to the housing 95 by its engagement with the divider wall 172 in the housing 95. A washer 188 may be employed not only to reduce the force concentration on the housing 95 but also to protect the housing 95 from possible degradation by engagement between the spring 185 and the material from which the housing 95 might be made. Likewise, a bearing washer 189 and a force distribution washer 190 may be received in the recess 144 to reduce the force concentration between the round head 157 of the draw bolt 96 and the reaction surface 166 at one end of the recess 144 in the tray frame 141. Thus, the friction forces in the brake pads 122 and 123, which may be identical to those depicted in FIGS. 3 and 4, will determine the angular position of the tray assembly 15 about the pivot axis 24. The amount of friction force available is determined by the force applied by spring 185 which, of course, is controlled by the tightness of the nut 187 on the draw bolt 96. As such, the spring force can be changed by simply tightening or loosening the draw bolt 96 into the captured nut 187.

Fourth Variation

Figure 12:
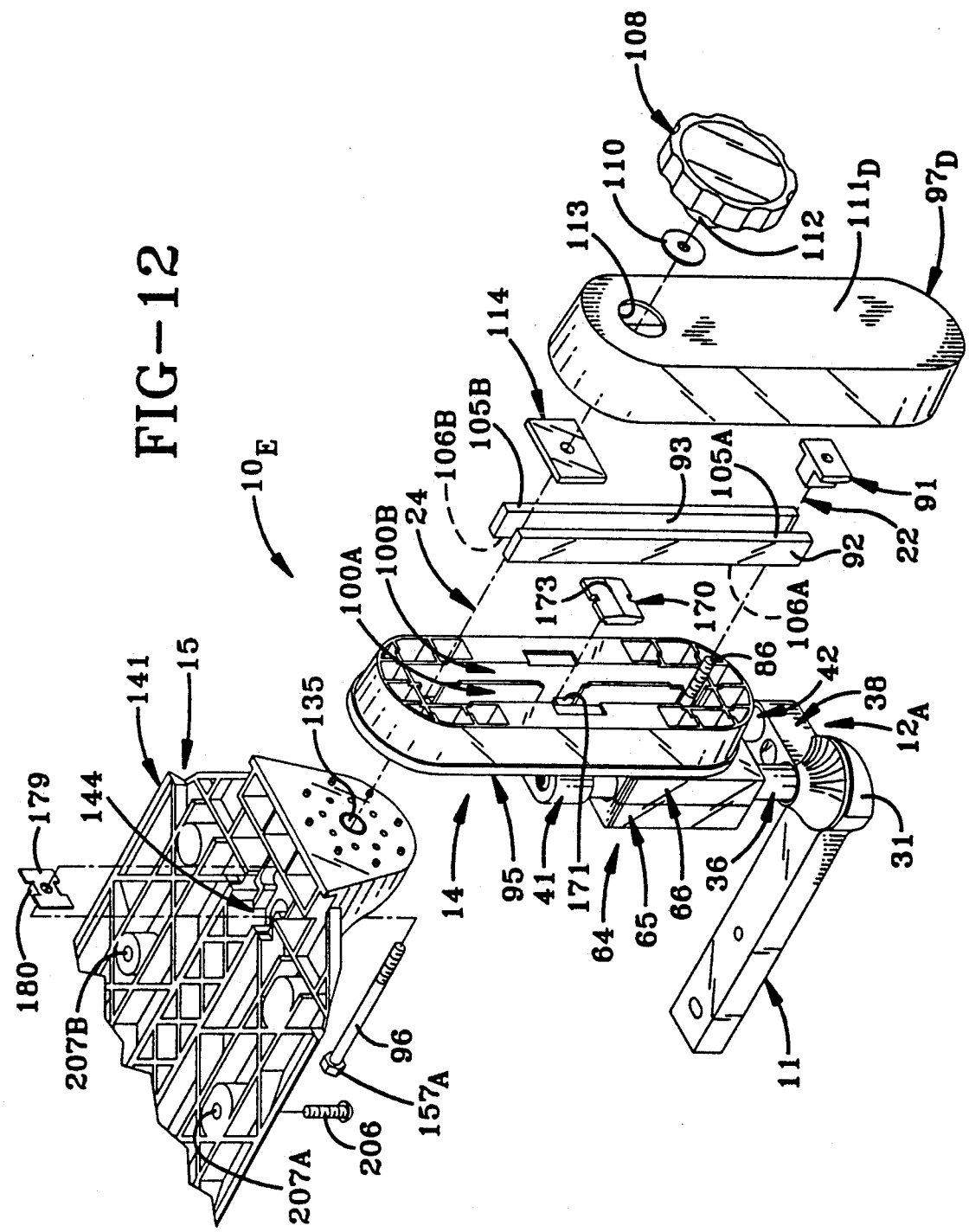
FIG. 12 is an exploded perspective of a further variation wherein the locking mechanism for controlling articulation, pivotal movement and elevation of the tray assembly are actuated by a single knob.

The variation embodied in adjusting mechanism 10$_E$ represented in FIG. 12 uses the same braking arrangement at the lower end of the arm assembly 14 as previously described herein with respect FIGS. 3, 8 and 10 to release and hold articulation, and the vertical disposition, of the arm assembly 14. However, the braking arrangement is actuated by the same rocking arrangement of the clamp bars 92 and 93 employed in variation 10$_B$ shown and described in relation to FIG. 8. The primary difference is that in mechanism 10$_E$ actuation is effected by a single adjustment control knob 108 in a manner similar to that by which actuation is effected with the adjusting control knob 108B employed with variation 10$_C$—as shown and described in conjunction with FIG. 10. Thus, while the clamp bars 92 and 93 and rocker plate 170 are identical to the construction of mechanism 10$_B$—as represented and described in conjunction with FIG. 8—rocking the clamp bars 92 and 93 to actuate the brake pads 116 and 117 is effected by manipulation of the single actuating control knob 108 by applying, or releasing, pressure against the clamp bars 92 and 93 with the thrust force distribution washer 114.

Actuating control to select the tilted disposition of the tray assembly 15 about the pivot axis 24 utilizes the arrangement that is shown and described with respect to mechanism 10$_C$ depicted in FIG. 10. That is, the head 157$_A$ (which has a polygonal outer edge surface) on the second draw bolt 96 is captured in a hex washer plate 179 that is supported in the recess 144 provided in tray frame 141. The hex washer plate 179 has reaction tabs 180 which engage the tray frame 141 in such a way as to prevent it, and thus the second draw bolt 96, from rotating. The second draw bolt 96 also passes through the components received within the bore 135 in the tray assembly 15, as previously discussed with respect to FIGS. 3-7, and into the housing 95 operatively to engage the control knob 108. The shank 112 on knob 108 extends through the opening 113 in the outer surface 111$_D$ of the cover 97$_D$ to interact with the thrust force distribution washer 114. A bearing washer 110 may also be interposed between the shank 112 and the thrust washer 114 for the same purposes previously discussed herein.

Figure 5:
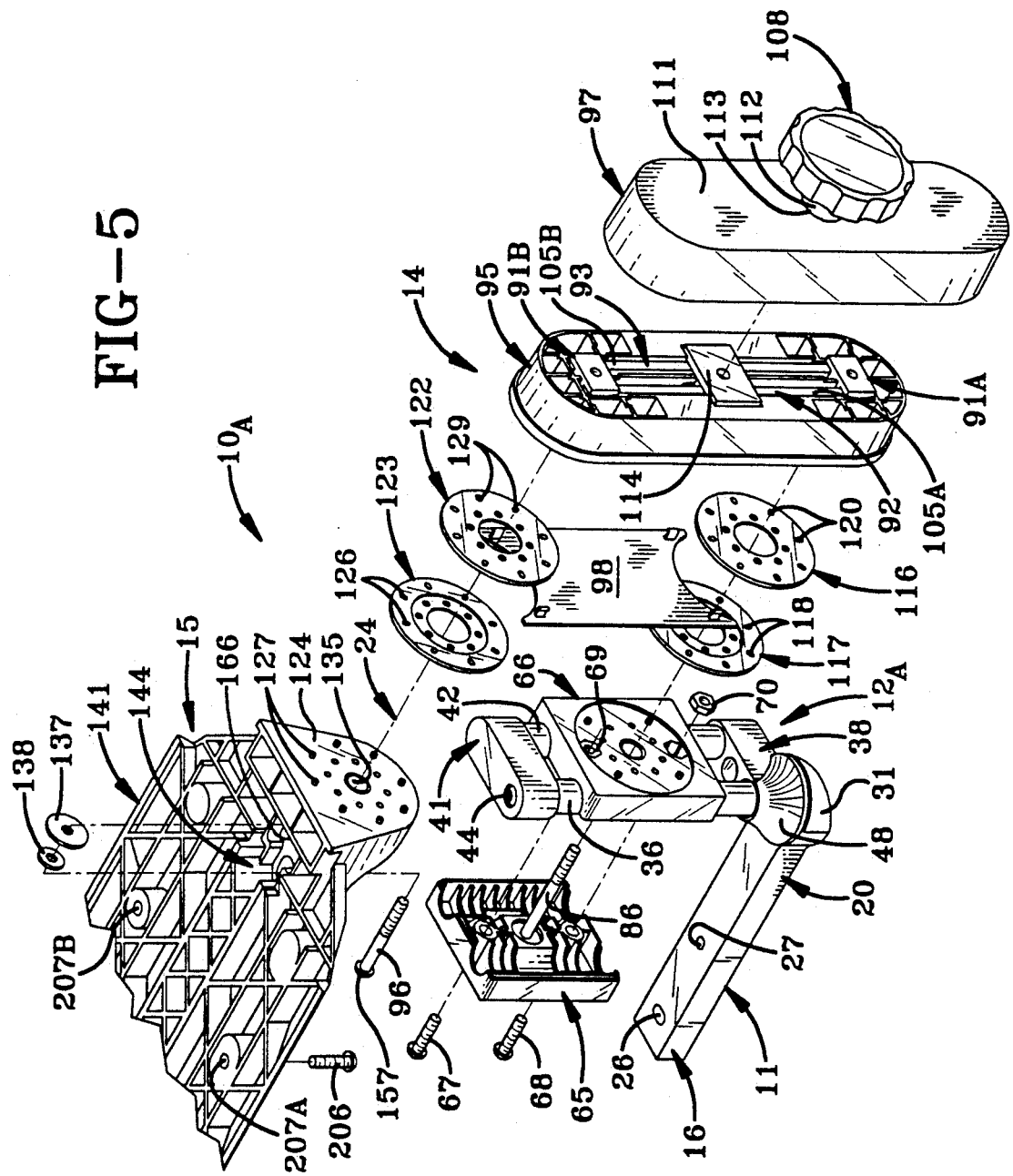
FIG. 5 is a view similar to FIG. 3 but with the vertical support assembly represented as having been assembled to the mounting bar and with a number of the components in the support assembly as well as a number of components in the arm assembly having also been assembled.

To summarize, loosening the adjustment control knob 108 directly releases the force which drives the brake pads 122 and 123 (shown and described in conjunction with the arrangement depicted in FIGS. 3-5) to permit tilting adjustment of the tray assembly 15. This same movement of the knob 108, however, also loosens not only the brake pads 116 and 117 but also the lock block 81 in the vertical support assembly 12$_A$ by the rocking action of the clamp bars 92 and 93. As described in conjunction with mechanism 10$_B$ depicted in FIG. 8, the reaction of the clamp bars 92 and 93 against the rocker plate 170 is effective selectively to apply, and withdraw, the force required to draw the brake pads 116 and 117 into frictional engagement and simultaneously force the lock block 81 into engagement with the guide tubes 36 and 42. Thus, not only is the tilted position of the tray assembly 15 adjustable by manipulation of a single adjustment control knob 108 in the variant mechanism 10$_E$ but also the articulation, and height, of the arm assembly 14.

Second Embodiment

Figure 13:
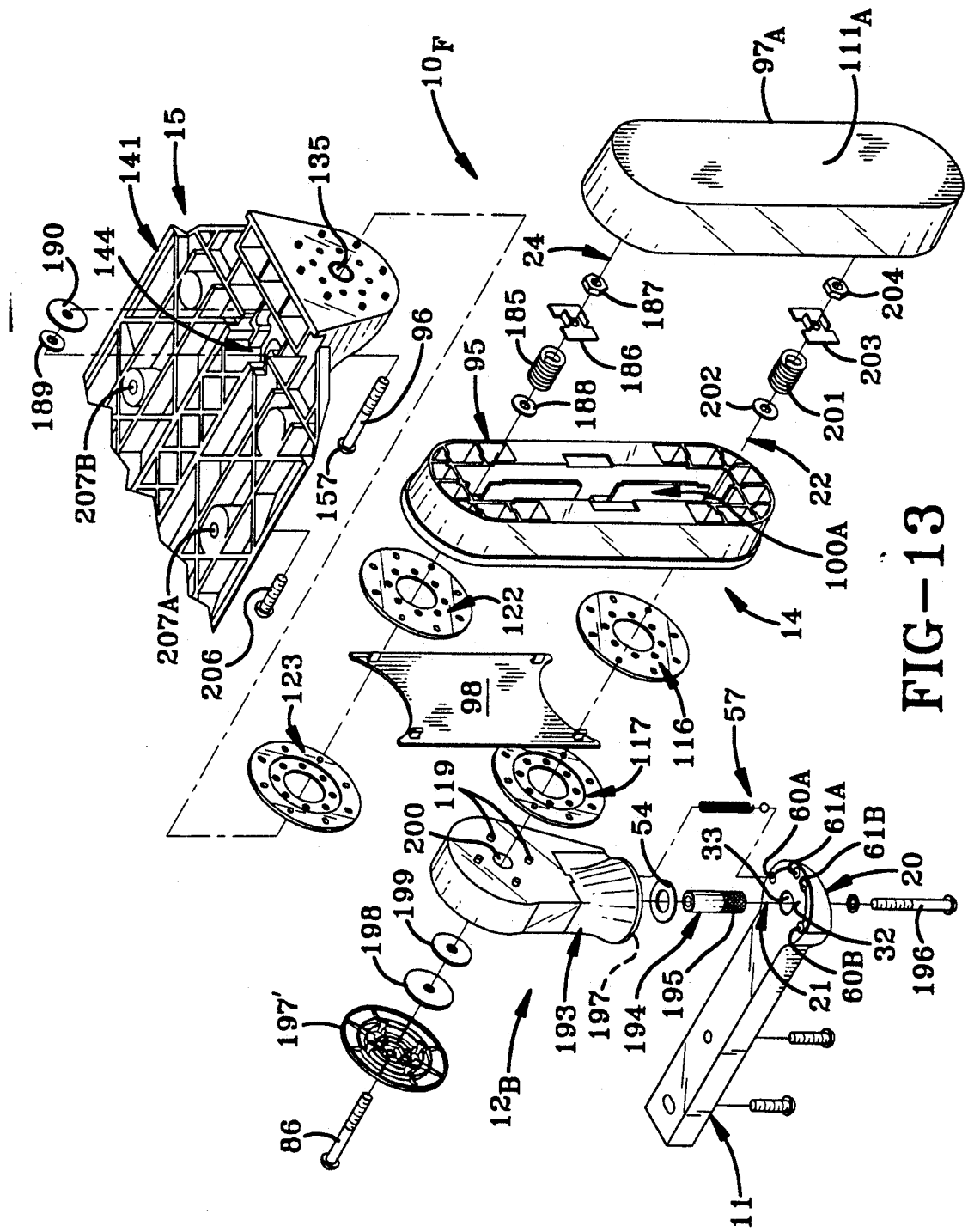
FIG. 13 is an exploded perspective of a still further variation of the adjusting mechanism in that the locking mechanism which controls articulation of the arm assembly and pivotal movement of the tray assembly are both spring biased to permit those adjustments without the necessity to actuate either a lever or a knob, while elevation is fixed.

In the embodiment represented by mechanism 10$_F$ depicted in FIG. 13 the vertical position of the tray assembly 15 provided by the support assembly 12$_B$ is fixed. However, the mechanism 10$_F$ provides for adjustment of the tray assembly 15 about the pivot axis 24, adjustment of the arm assembly 14 about the axis of articulation 22 and rotational movement of the support assembly 12$_B$ about the vertically oriented rotational axis 21. Adjustment about the rotary axis 21 is accomplished in a manner similar to that provided in each of the foregoing variations. That is, recesses 60 and 61, in the mounting bar 11, and a conventional ball detent assembly 57, presented from the vertical support assembly 12$_B$, cooperatively interact. The support assembly 12$_B$ has a stanchion 193 that houses the ball detent mechanism 57, and the support assembly 12$_B$ is rotatably mounted on the mounting bar 11 by a post 194 having a knurled end 195 that may be press fit into the opening 33 in the distal end portion 20 of the mounting bar 11. The knurling precludes rotation of the post 194 relative to the mounting bar 11. A threaded fastener 196 extends upwardly through the post 194 and threadably engages the stanchion 193. A thrust washer 54 is disposed between the base 197 of the stanchion 193 and the upwardly facing surface 32 of the mounting bar 11.

Angular control of the arm assembly 14 about the articulation axis 22 is controlled by a spring-biased friction arrangement generally comparable to that shown for the pivot axis 24 control in mechanism 10$_D$ shown and described in conjunction in conjunction with FIG. 11. That is, the draw bolt 86 passes through a decorative cover 199, a pair of thrust washers 198 and 199 and an opening 200 which penetrates the stanchion 193. The draw bolt 86 then passes through the brake pads 116 and 117. Brake pad 116 is non-rotatably carried on the housing 95 in the same manner shown and described in conjunction with FIGS. 3 and 4. Posts 119 are presented from the stanchion 193 in the same manner as the posts 119 are presented from the slide block 66 shown and described with respect to those figures so that brake pad 117 may be non-rotatably carried on stanchion 193.

After the draw bolt 86 passes through housing 95 it is surrounded by a spring 201 which is retained between a washer 202 that engages the housing 95 and the hex washer plate 203 which also engages the housing 95. The thrust washer 202 is disposed between the end of spring 201 and the base wall 171 (FIG. 4) in the housing 95. The hex washer plate 203 spans both, and is retained in, the recesses 100 in housing 95 in spaced relation outwardly from the base wall 171. A hex nut 204 is captured by the hex washer plate 203 such that the nut 204 is also non-rotatable with respect to the housing 95. The frictional force present to determine the angular position of the arm assembly 14 is established by the tightness of the draw bolt 86. This force may, of course, be adjusted by tightening the draw bolt 86 into the captured nut 204.

The angular position of the tray assembly about the pivot axis 24 may be established and provided by a structure identical to that previously described herein the variant mechanism 10$_D$ shown in FIG. 11. It is believed that a repetition of that description is not necessary.

Variations of the Second Embodiment

Figure 14:
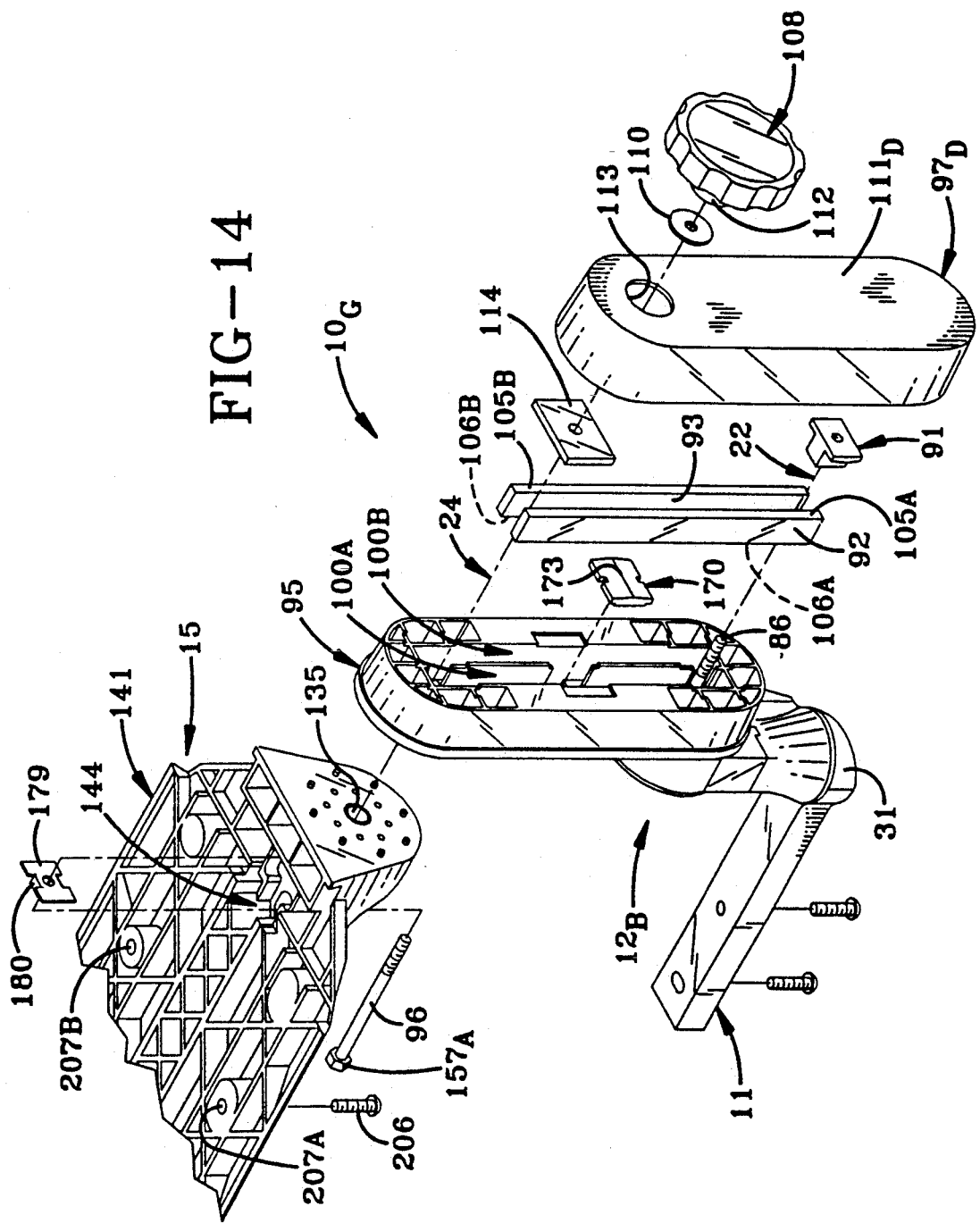
FIG. 14 is an exploded perspective of an even further variation wherein the locking mechanism for controlling articulation of the arm assembly and pivotal movement of the tray assembly are actuated by a single knob located in proximity to one end of the arm assembly, while elevation is fixed.

The variation embodied in the adjusting mechanism 10$_G$ shown in FIG. 14 utilizes a vertical support 12$_B$ which may be identical to that incorporated in mechanism 10$_F$ represented in FIG. 13, and the angular controls relative to the disposition of the arm assembly 14 about the articulation axis 22 and the tray assembly 15 about the pivot axis 24 may be identical to those used in conjunction with the mechanism variation 10$_E$ disclosed in FIG. 12.

Figure 15:
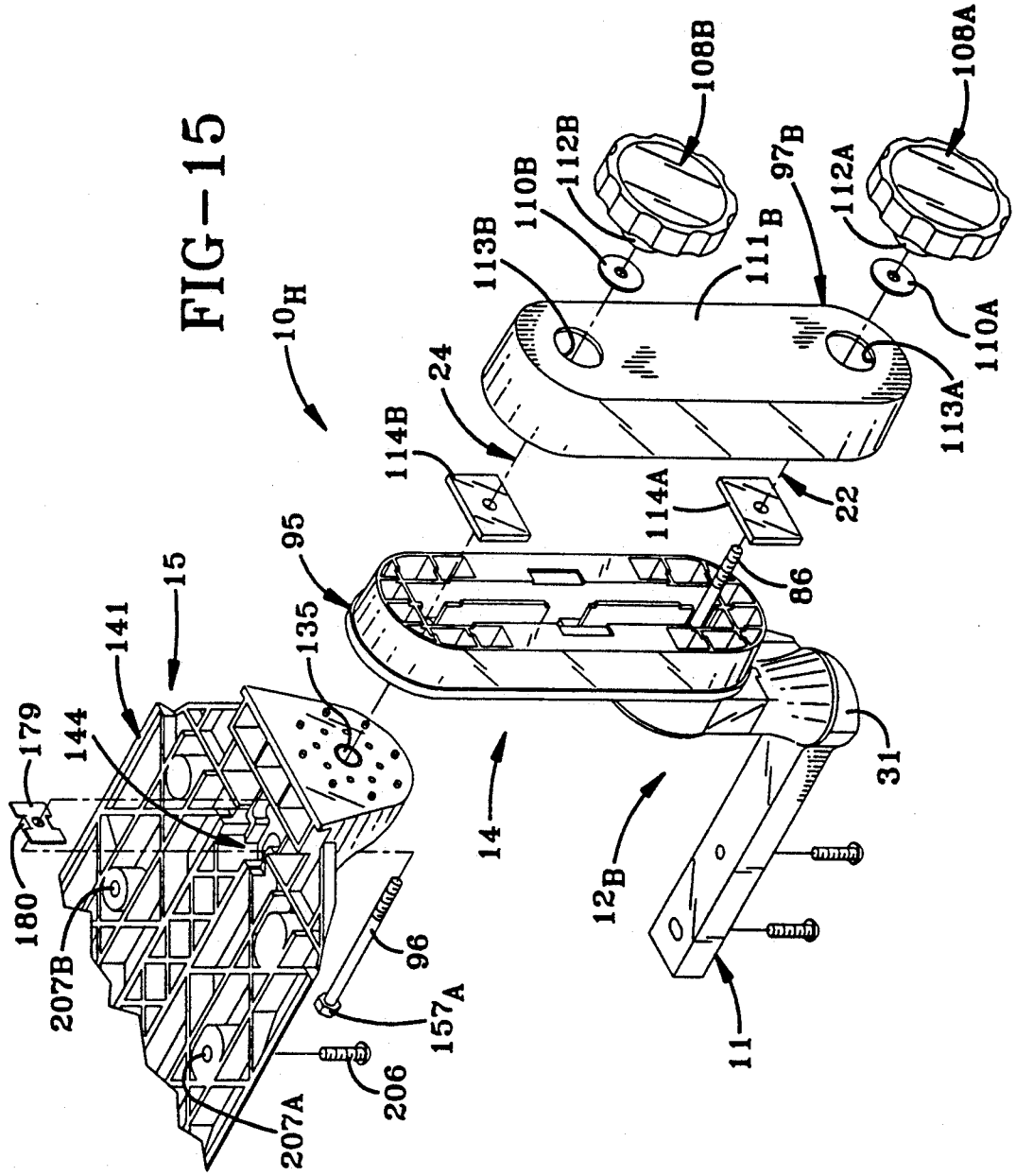
FIG. 15 is an exploded perspective of a variation of the embodiment depicted in FIG. 14 wherein the locking mechanism for controlling articulation of the arm assembly and pivotal movement of the tray assembly are individually actuated by separate knobs, one for controlling articulation of the arm assembly and one for controlling pivotal movement of the tray assembly; and, FIG. 16 is an exploded perspective of a further variation of the embodiment depicted in FIGS. 14 and 15 wherein the locking mechanism for controlling articulation of the arm assembly and pivotal movement of the tray assembly are actuated by a single knob located centrally of the arm assembly.

The variations 10$_H$ and 10$_J$ shown in FIGS. 15 and 16, respectively, both use vertical support assemblies 12$_B$ identical to those shown in FIG. 13. The FIG. 15 variation 10$_H$ utilizes, in the angular controls for the articulation axis 22 and the pivot axis 24, structure that is identical to that described relative to variation 10$_C$ shown in FIG. 10. Adjustment mechanism variation 10$_J$ depicted in FIG. 16, while utilizing a vertical support assembly 12$_B$ described in conjunction with variation 10$_F$ shown in FIG. 13, also utilizes structure that is identical to that described with respect to FIG. 3 to effect the angular controls about the articulation axis 22 and the pivot axis 24.

Summation

One skilled in the art will appreciate, at this point, that many variations, not explicitly described, are possible. For example, the single lever control 140 described for the structural variation 10$_B$ depicted in FIG. 8 could be used with the fixed vertical support assembly 12$_B$ described for the structural variation 10$_F$ shown in FIG. 13.

As was previously mentioned, the mounting bar 11 may be secured to the underside 17 of the chair seating frame 18 for either right hand or left hand usage of the chair. Inasmuch as the tray surface member 142 has a generally arcuate recess 205 (FIGS. 2 and 8) along at least one edge thereof which provides a "wrap around" affect for the computer operator, changing from right to left hand usage will require that the tray surface member 142 be removed from the tray frame 141 and rotated horizontally through 180 degrees to locate the arcuate recess 205 properly when the adjustment mechanism 10 is changed from one to the other side of the chair. This result can be readily accomplished by securing the tray surface member 142 to the tray frame 141 by four fasteners 206 in the nature of screws which extend through the holes 207A, 207B, 207C and 207D in the tray frame 141 operatively to engage the under surface 147 on the tray surface member 142.

As should now be apparent, the present invention not only teaches that an adjusting mechanism embodying the concepts of the present invention can be readily supplied for use in conjunction with a chair-mounted computer input device but also that the other objects of the invention can likewise be accomplished.

We claim:

1. An adjusting assembly for mounting a supporting tray assembly to a chair, said adjusting assembly comprising:
    a substantially horizontally disposed mounting bar having distal and proximal end portions;
    said proximal end portion supported from a chair;
    a substantially vertically disposed support assembly mounted from the distal end portion of said mounting bar;
    an arm assembly having first and second end portions;
    the first end portion of said arm assembly supported for articulation from said support assembly;
    a tray assembly pivotally supported from the second end portion of said arm assembly;
    said arm assembly being mounted to articulate with respect to said support assembly about an articulating axis that is disposed substantially horizontally;
    said tray assembly being mounted to pivot with respect to said arm assembly about a pivotal axis that is disposed substantially horizontally; and, a single selectively operable locking means being provided for simultaneously securing the pivotal position of said tray assembly with respect to said arm assembly and the articulated position of said arm assembly with respect to said support assembly.

2. An adjusting assembly, as set forth in claim 1, wherein:
said arm assembly is articulated with respect to said support assembly about an articulating axis that is disposed substantially horizontally; and,
means are provided selectively to establish the distance between said mounting bar and said articulating axis.

3. An adjusting assembly, as set forth in claim 2, wherein:
said tray assembly is pivotal with respect to said arm assembly about a pivotal axis that is disposed substantially horizontally; and,
said locking means is operable simultaneously
to secure the selected pivotal position of said tray assembly with respect to said arm assembly;
to secure the selected articulation of said arm assembly with respect to said support assembly; and,
to establish the selected distance between said mounting bar and said articulating axis.

4. An adjusting assembly, as set forth in claim 3, wherein:
said arm assembly has a housing which defines said first and second end portions of said arm assembly;
a friction means is associated with each said first and second end portions defined by said housing;
a portion of said support assembly is embraced between a lock block and a slide block;
said slide block having a friction means disposed in opposition to said friction means associated with the first end portion of said housing;
said tray assembly presenting a friction means disposed in opposition to said friction means associated with the second end portion of said housing.

5. An adjusting assembly, as set forth in claim 4, wherein said locking means further comprise:
clamp bar means supported from said housing;
a plurality of clamp actuator means engaging said clamp bar means;
first draw means effecting an operative connection between said lock block and one said clamp actuator means;
second draw means effecting an operative connection between said tray assembly and a second clamp actuator means;
fulcrum means supported from said housing and engaging the medial portion of said clamp bar means;
a release actuator means operatively engaging said second draw means;
spring means which bias said second draw means to secure said tray assembly frictionally to said housing;
a lever means to move said release actuator means operatively to overcome said spring means and thereby not only to release said first draw means to permit selected elevational movement of said housing with respect to said support means and to permit selected articulation of said housing with respect to said support means but also to release said second draw means to permit rotation of said tray assembly with respect to said housing.

6. An adjusting assembly, as set forth in claim 5, wherein:
said tray assembly has a frame from which a tray member is supported;
a recess is provided in said tray frame to receive said release actuator means;
a pair of laterally spaced journal means are presented from said tray frame for access within said recess;
a pair of bearing surfaces are presented from said release actuator means operatively to engage said journal means such that actuation of said lever means swings said release actuator means about one or the other of said journal means.

7. An adjusting assembly, as set forth in claim 6, wherein:
said release actuator means presents a cam surface that operatively engages said second draw means and said spring means such that swinging said release actuator means releases the locking means operated by said second draw means and compresses said spring to reengage said locking means upon release of said lever means.

8. An adjusting assembly, as set forth in claim 7, wherein:
said release actuator means is penetrated by a slotted aperture which permits access to said second draw means for adjusting second draw means;
a channel is recessed into said release actuator means to receive said lever, said channel being oriented in spaced vertical relation relative to said slotted aperture and being disposed substantially transversely with respect thereto.

9. An adjusting assembly, as set forth in claim 4, wherein said locking means further comprise:
clamp bar means supported from said housing;
clamp actuator means engaging said clamp bar means;
first draw means effecting an operative connection between said lock block and one said clamp actuator means;
fulcrum means supported from said housing and engaging the medial portion of said clamp bar means;
second draw means effecting an operative connection between said tray assembly and a knob means;
thrust plate means interposed between said knob means and said clamp bar means such that actuation of said knob means pivots said clamp bar means about said fulcrum means selectively to clamp a portion of said support assembly between said clamp block and said slide block as well as to clamp said first friction means between said slide block and said housing and said second friction means between said tray assembly and said housing.

10. An adjusting assembly, as set forth in claim 1, wherein:
said arm assembly has a housing which defines said first and second end portions of said arm assembly;
a friction means is associated with each said first and second end portions defined by said housing;
said support assembly has a friction means disposed in opposition to the friction means associated with said first end portion of said housing;
said tray assembly presenting a friction means disposed in opposition to said friction means associated with the second end portion of said housing;
locking means selectively to bring said friction means presented from said support means into operative cooperation with said friction means associated with the first end portion of said housing as well as to bring said friction means associated with said tray assembly into operative cooperation with the friction means associated with the second end portion of said housing.

11. An adjusting assembly, as set forth in claim 10, wherein:
draw means are provided to effect an operative connection between the friction means presented from said support means and the friction means associated with the first end portion of said housing;
second draw means to effect an operative connection between the friction means presented from said tray assembly and the friction means associated with the second end portion of said housing;
said locking means comprises spring means which bias said first and second draw means to effect the operative connection established by each.

12. An adjusting assembly, as set forth in claim 1, wherein:
said support assembly comprises a stanchion which provides a fixed elevation between said support assembly and said articulation axis.

13. An adjusting assembly, as set forth in claim 12, wherein:
first draw means effect an operative connection between the friction means presented from said stanchion and the friction means associated with the first end portion of said housing;
second draw means to effect an operative connection between the friction means presented from said tray assembly and the friction means associated with the second end portion of said housing;
said locking means comprises knob means which effects the operative connection established by said first draw means and spring means which bias said second draw means to effect the operative connection established thereby.

14. An adjusting assembly, as set forth in claim 12, wherein said locking means further comprises:
clamp bar means supported from said housing;
clamp actuator means engaging said clamp bar means;
first draw means effecting an operative connection between said stanchion and one said clamp actuator means;
second draw means effecting an operative connection between said tray assembly and a second clamp actuator means;
knob means effecting an operative connection with said clamp bar means such that actuation of said knob means displaces said first draw means selectively to clamp said housing to said stanchion and also displaces said second draw means selectively to clamp said tray assembly to said housing.

15. An adjusting assembly, as set forth in claim 12, wherein said locking means further comprise:
clamp bar means supported from said housing;
clamp actuator means engaging said clamp bar means;
first draw means effecting an operative connection between said housing and said stanchion;
fulcrum means supported from said housing and engaging the medial portion of said clamp bar means;
second draw means effecting an operative connection between said tray assembly and a knob means;
thrust plate means interposed between said knob means and said clamp bar means such that actuation of said knob means pivots said clamp bar means about said fulcrum means selectively to clamp said housing to said stanchion as well as to clamp said tray assembly to said housing.

16. An adjusting assembly, as set forth in claim 12, wherein:
said arm assembly has a housing which defines said first and second end portions of said arm assembly;
a friction means is associated with each said first and second end portions defined by said housing;
said stanchion having a friction means disposed in opposition to said friction means associated with the first end portion of said housing;
said tray assembly presenting a friction means disposed in opposition to said friction means associated with the second end portion of said housing.

17. An adjusting assembly, as set forth in claim 16, wherein:
a first brake pad means is interposed between said friction means presented from said stanchion and said friction means associated with the first end portion of said housing; and,
a second brake pad means is interposed between said friction means presented from said tray assembly and said friction means associated with the second end portion of said housing.

18. An adjusting assembly, as set forth in claim 17, wherein said support assembly further comprises:
a mounting pin secured to, and extending upwardly from, the distal end portion of said mounting bar; and,
said stanchion cooperatively engaging said mounting pin for rotation about a vertical rotational axis.

19. An adjusting assembly, as set forth in claim 18, further comprising:
detent means to determine the range of rotation between said stanchion and the distal end portion of said mounting bar.

20. An adjusting assembly for mounting a supporting tray assembly to a chair, said adjusting assembly comprising:
a substantially horizontally disposed mounting bar having distal and proximal end portions;
said proximal end portion supported from the chair;
a substantially vertically disposed support assembly mounted from the distal end portion of said mounting bar;
an arm assembly having first and second end portions;
said first end portion of said arm assembly supported for articulation from said support assembly about an articulating axis that is disposed substantially horizontally;
a tray assembly pivotally supported from the second end portion of said arm assembly about a pivotal axis that is disposed substantially horizontally;
means selectively to establish the distance between said mounting bar and said articulating axis;
locking means being provided
to secure the selected pivotal position of said tray assembly with respect to said arm assembly;
to secure the selected articulation of said arm assembly with respect to said support assembly; and,
to establish the selected distance between said mounting bar and said articulating axis;

said arm assembly having a housing which defines said first and second end portions of said arm assembly;
a friction means associated with each said first and second end portions defined by said housing;
a portion of said support assembly being embraced between a lock block and a slide block;
said slide block having a friction means disposed in opposition to said friction means associated with the first end portion of said housing;
said tray assembly presenting a friction means disposed in opposition to said friction means associated with the second end portion of said housing;
clamp bar means supported from said housing;
clamp actuator means engaging said clamp bar means;
first draw means effecting an operative connection between said lock block and one said clamp actuator means;
second draw means effecting an operative connection between said tray assembly and a second clamp actuator means; and,
knob means effecting an operative connection with said clamp bar means such that actuation of said knob means displaces said first draw means selectively to clamp said slide and lock blocks to said support assembly as well as said slide block to said housing and displaces said second draw means selectively to clamp said tray assembly to said housing.

21. An adjusting assembly, as set forth in claim 20, wherein:
a first brake pad means is interposed between said friction means presented from said slide block and said friction means associated with the first end portion of said housing; and,
a second brake pad means is interposed between said friction means presented from said tray assembly and said friction means associated with the second end portion of said housing.

22. An adjusting assembly, as set forth in claim 20, wherein said support assembly further comprises:
a mounting pin secured to, and extending upwardly from, the distal end portion of said mounting bar;
a retainer rotatably mounted on said mounting pin;
a pair of guide tubes extending upwardly from said retainer;
said lock block and said slide block cooperatively interacting with said guide tubes to effect the selective clamping action therebetween.

23. An adjusting assembly, as set forth in claim 22, further comprising:
detent means operatively disposed on said mounting bar to determine the range of rotation between said retainer and the distal end portion of said mounting bar.

* * * * *